(12) United States Patent
Rico Alvarino et al.

(10) Patent No.: US 11,109,372 B2
(45) Date of Patent: Aug. 31, 2021

(54) NARROW-BAND PHYSICAL CONTROL CHANNEL DESIGN

(71) Applicant: QUALCOMM Incorporated, San Diego, CA (US)

(72) Inventors: Alberto Rico Alvarino, San Diego, CA (US); Peter Gaal, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 15/271,898

(22) Filed: Sep. 21, 2016

(65) Prior Publication Data
US 2017/0201982 A1 Jul. 13, 2017

Related U.S. Application Data

(60) Provisional application No. 62/277,395, filed on Jan. 11, 2016.

(51) Int. Cl.
*H04W 72/04* (2009.01)
*H04L 5/00* (2006.01)
(Continued)

(52) U.S. Cl.
CPC ......... *H04W 72/0446* (2013.01); *H04L 5/003* (2013.01); *H04L 5/005* (2013.01);
(Continued)

(58) Field of Classification Search
None
See application file for complete search history.

(56) References Cited

U.S. PATENT DOCUMENTS

| 9,749,771 B2 | 8/2017 | Xu et al. |
| 2010/0124237 A1* | 5/2010 | Chun ............ H04L 47/10 370/469 |

(Continued)

FOREIGN PATENT DOCUMENTS

| CN | 102484616 A | 5/2012 |
| CN | 102595490 A | 7/2012 |

(Continued)

OTHER PUBLICATIONS

3GPP TSG-RAN WG1 #83 R1-157419; Nov. 15-22, 2015; NB-IoT—DL Design; Ericsson (Year: 2015).*

(Continued)

*Primary Examiner* — Jeffrey M Rutkowski
*Assistant Examiner* — Ning Li
(74) *Attorney, Agent, or Firm* — Holland & Hart LLP; Nerrie M. Zohn

(57) ABSTRACT

Techniques are described for wireless communication. One method includes allocating, in a downlink carrier including a plurality of resource blocks, a first set of resource elements for cell-specific reference signals (CRS) associated with communication with one or more communication devices of a first type; allocating resources of a resource block of the plurality of resource blocks to a narrow-band physical channel for communication with one or more communication devices of a second type, the allocated resources being rate-matched around the first set of resource elements and a second set of resource elements allocated to narrow-band CRS (NB-CRS) associated with communication with the one or more communication devices of the second type; and transmitting information to the one or more communication devices of the second type mapped to a subset of the allocated resources of the narrow-band physical channel.

63 Claims, 16 Drawing Sheets

(51) Int. Cl.
  *H04L 27/26* (2006.01)
  *H04W 4/70* (2018.01)
  *H04L 1/06* (2006.01)
(52) U.S. Cl.
  CPC .......... *H04L 5/0007* (2013.01); *H04L 5/0044* (2013.01); *H04L 5/0048* (2013.01); *H04L 5/0073* (2013.01); *H04L 27/261* (2013.01); *H04W 4/70* (2018.02); *H04W 72/042* (2013.01); *H04W 72/048* (2013.01); *H04W 72/0453* (2013.01)

(56) References Cited

U.S. PATENT DOCUMENTS

| | | | |
|---|---|---|---|
| 2013/0039188 A1* | 2/2013 | Larsson | H04L 1/0039 370/241 |
| 2013/0083753 A1* | 4/2013 | Lee | H04L 1/0026 370/329 |
| 2013/0121274 A1* | 5/2013 | Chen | H04L 5/0053 370/329 |
| 2014/0233459 A1 | 8/2014 | Dahod et al. | |
| 2014/0293843 A1* | 10/2014 | Papasakellariou | H04W 72/042 370/280 |
| 2014/0341163 A1* | 11/2014 | Zhang | H04B 7/024 370/329 |
| 2015/0009936 A1* | 1/2015 | Quan | H04W 74/008 370/329 |
| 2015/0131560 A1* | 5/2015 | Von Elbwart | H04W 72/042 370/329 |
| 2015/0162970 A1 | 6/2015 | Kamalizad et al. | |
| 2015/0230234 A1* | 8/2015 | Choi | H04B 7/0417 370/329 |
| 2015/0341956 A1 | 11/2015 | Sun et al. | |
| 2016/0081115 A1* | 3/2016 | Pang | H04W 56/001 370/329 |
| 2016/0100422 A1* | 4/2016 | Papasakellariou | H04L 1/1861 370/329 |
| 2016/0295345 A1* | 10/2016 | Oh | H04W 4/70 |
| 2016/0338111 A1* | 11/2016 | Han | H04W 74/0833 |
| 2017/0171841 A1* | 6/2017 | Chen | H04L 5/0007 |
| 2017/0181135 A1* | 6/2017 | Chen | H04L 5/0048 |
| 2017/0238288 A1 | 8/2017 | Chen et al. | |
| 2017/0273059 A1* | 9/2017 | You | H04L 25/03 |
| 2017/0289973 A1* | 10/2017 | Yang | H04L 27/26 |
| 2018/0212736 A1* | 7/2018 | Chatterjee | H04L 5/0048 |
| 2018/0241495 A1* | 8/2018 | Xue | H04J 11/00 |
| 2018/0249509 A1* | 8/2018 | Yl | H04W 48/18 |
| 2018/0317198 A1* | 11/2018 | Lee | H04W 4/70 |

FOREIGN PATENT DOCUMENTS

| | | |
|---|---|---|
| CN | 103891180 A | 6/2014 |
| CN | 105122830 A | 12/2015 |
| JP | 2014524194 A | 9/2014 |
| JP | 2015531201 A | 10/2015 |
| WO | WO-2013169470 A1 | 11/2013 |

OTHER PUBLICATIONS

Alcatel-Lucent et al., "NB-LTE—Concept Description L2/L3," 3GPP TSG RAN Meeting #69, RP-151387, Phoenix, USA, Sep. 14-16, 2015, 20 pgs., XP050999862, 3rd Generation Partnership Project.
Ericsson, "NB-IoT—DL Design," 3GPP TSG-RAN WG1 Meeting #83, R1-157419, Anaheim, California, USA, Nov. 15-22, 2015, 11 pgs., XP051040113, 3rd Generation Partnership Project.
Huawei et al., "NB-IOT—Downlink Physical Layer Concept Description," 3GPP TSG RAN WG1 Meeting #83, R1-156462, Anaheim, USA, Nov. 15-22, 2015, 11 pgs., XP051039851, 3rd Generation Partnership Project.
ISA/EP, International Search Report and Written Opinion of the International Searching Authority, Int' Application No. PCT/US2016/063071, Apr. 13, 2017, European Patent Office, Rijswijk, NL, 24 pgs.
Mediatek Inc., "Coverage Analysis of PDSCH and Enhancement Techniques for MTC UEs," 3GPP TSG-RAN WG1 Meeting #72bis, R1-131180, Chicago, USA, Apr. 14-19, 2013, 7 pgs., XP050697097, 3rd Generation Partnership Project.
Mediatek Inc., "On the Need of PDCCH for SIB and Other Common Channels," 3GPP TSG-RAN WG1 Meeting #75, R1-135422, San Francisco, USA, Nov. 11-15, 2013, 6 pgs., XP050735100, 3rd Generation Partnership Project.
ISA/EPO, Partial International Search Report of the International Searching Authority, Int'l App. No. PCT/US20161063071, dated Feb. 20, 2017, European Patent Office, Rijswijk, NL, 8 pgs.
Samsung, "Narrowband IOT—Downlink Control/Data Channel Design," 3GPP TSG RAN WG1 Meeting #82bis, R1-155512, Malmo, Sweden, Oct. 5-9, 2015, 7 pgs., XP051002404, 3rd Generation Partnership Project.
Taiwan Search Report—TW105138008—TIPO—Sep. 7, 2020.
Samsung et al., "NB-LTE—Inband Operation", 3GPP Draft, 3GPP TSG RAN Meeting #69, RP-151557_NB-LTE—Inband Operation (Update of RP-151379), 3RD Generation Partnership Project (3GPP), Mobile Competence Centre, 650, Route Des Lucioles, F-06921 Sophia-Antipolis Cedex, vol. TSG RAN, No. Phoenix, USA, Sep. 14, 2015-Sep. 16, 2015, 15 Sep. 2015, XP051654405, 14 pages, Retrieved from the Internet: URL: http://www.3gpp.org/ftp/tsg%5Fran/TSG%5FRAN/TSGR%5F69/Docs/RP%2D151557/02Ezip [retrieved on Sep. 15, 2015] sections 2.1, 3.2, 5.2.2-5.2.4.
Taiwan Search Report—TW105138008—TIPO—dated Jul. 1, 2021.

* cited by examiner

NARROW-BAND PHYSICAL CONTROL CHANNEL DESIGN

CROSS REFERENCES

The present Application for Patent claims priority to U.S. Provisional Patent Application No. 62/277,395 by Rico Alvarino et al., entitled "Narrow-band Physical Control Channel Design," filed Jan. 11, 2016, assigned to the assignee hereof.

BACKGROUND

Field of the Disclosure

The present disclosure, for example, relates to wireless communication systems, and more particularly to techniques for configuring narrow-band physical channels.

Description of Related Art

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system or LTE-Advanced (LTE-A) system). A wireless multiple-access communication system may include a number of base stations, each simultaneously supporting communication for multiple communication devices, which may be otherwise known as user equipment (UEs). A base station may communicate with UEs on downlink channels (e.g., for transmissions from a base station to a UE) and uplink channels (e.g., for transmissions from a UE to a base station).

Some types of UEs may communicate with a base station or other UEs using narrow-band communication. Narrow-band communication may include, for example, narrow-band LTE (NB-LTE) communication, M2M communication (of which Machine Type Communication (MTC) or enhanced MTC (eMTC) may be considered a part for purposes of this disclosure), NB-Internet of Things (NB-IoT) communication, and the like.

SUMMARY

The present disclosure, for example, relates to techniques for configuring narrow-band physical channels. Given the more limited resources of narrow-band communication, it may be desirable, in some cases, to allocate the resources of a narrow-band channel differently than the resources of a wide-band channel. However, given that narrow-band communication devices may operate within the same radio frequency spectrum band as wide-band communication devices, it may also be desirable, in some cases, to configure aspects of narrow-band communication to be compatible with wide-band communication.

In one example, a method of communication at a base station is described. The method may include allocating, in a downlink carrier including a plurality of resource blocks over a plurality of subframes, a first set of resource elements for cell-specific reference signals (CRS) associated with communication with one or more communication devices of a first type. The method may also include allocating resources of a resource block of the plurality of resource blocks to a narrow-band physical channel for communication with one or more communication devices of a second type, the allocated resources being rate-matched around the first set of resource elements and a second set of resource elements allocated to narrow-band CRS (NB-CRS) associated with communication with the one or more communication devices of the second type; and transmitting information to the one or more communication devices of the second type mapped to a subset of the allocated resources of the narrow-band physical channel.

In some examples, the method may also include determining to rate-match the allocated resources around the first set of resource elements and the second set of resource elements based on a deployment mode of the narrow-band physical channel. In some examples, the deployment mode includes an in-band deployment mode. In some examples, the transmitting the information to the one or more communication devices of the second type includes transmitting the information to the one or more communication devices of the second type based on a predetermined transmission mode. In some examples, the predetermined transmission mode includes transmit diversity based on a space frequency block code (SFBC).

In some examples, the allocating the resources of the resource block includes allocating a first set of frequency resources of the resource block for communication with a first device of the second type and allocating a second set of frequency resources of the resource block for communication with a second device of the second type. In some examples, the allocated resources include a plurality of resource element groups. In some examples, the plurality of resource element groups are rate matched around the first set of resource elements and the second set of resource elements.

In one example, an apparatus for communication at a base station is described. The apparatus may include means for allocating, in a downlink carrier including a plurality of resource blocks over a plurality of subframes, a first set of resource elements for CRS associated with communication with one or more communication devices of a first type. The apparatus may also include means for allocating resources of a resource block of the plurality of resource blocks to a narrow-band physical channel for communication with one or more communication devices of a second type, the allocated resources being rate-matched around the first set of resource elements and a second set of resource elements allocated to NB-CRS associated with communication with the one or more communication devices of the second type; and means for transmitting information to the one or more communication devices of the second type mapped to a subset of the allocated resources of the narrow-band physical channel.

In some examples, the apparatus may also include means for determining to rate-match the allocated resources around the first set of resource elements and the second set of resource elements based on a deployment mode of the narrow-band physical channel. In some examples, the deployment mode includes an in-band deployment mode. In some examples, the means for transmitting the information to the one or more communication devices of the second type includes means for transmitting the information to the one or more communication devices of the second type based on a predetermined transmission mode. In some examples, the predetermined transmission mode includes transmit diversity based on a SFBC.

In some examples, the means for allocating the resources of the resource block includes means for allocating a first set of frequency resources of the resource block for communication with a first device of the second type and means for allocating a second set of frequency resources of the resource block for communication with a second device of the second type. In some examples, the allocated resources include a plurality of resource element groups. In some examples, the plurality of resource element groups are rate matched around the first set of resource elements and the second set of resource elements.

In one example, another apparatus for communication at a base station is described. The apparatus may include a processor, memory in electronic communication with the processor, and instructions stored in the memory. The instructions may be executable by the processor to allocate, in a downlink carrier including a plurality of resource blocks over a plurality of subframes, a first set of resource elements for CRS associated with communication with one or more communication devices of a first type. The instructions may also be executable by the processor to allocate resources of a resource block of the plurality of resource blocks to a narrow-band physical channel for communication with one or more communication devices of a second type, the allocated resources being rate-matched around the first set of resource elements and a second set of resource elements allocated to NB-CRS associated with communication with the one or more communication devices of the second type; and to transmit information to the one or more communication devices of the second type mapped to a subset of the allocated resources of the narrow-band physical channel.

In some examples, the instructions may also be executable by the processor to cause the apparatus to determine to rate-match the allocated resources around the first set of resource elements and the second set of resource elements based on a deployment mode of the narrow-band physical channel. In some examples, the deployment mode includes an in-band deployment mode. In some examples, the instructions may also be executable by the processor to cause the apparatus to transmit the information to the one or more communication devices of the second type based on a predetermined transmission mode. In some examples, the predetermined transmission mode includes transmit diversity based on a SFBC.

In some examples, the instructions may also be executable by the processor to cause the apparatus to allocate a first set of frequency resources of the resource block for communication with a first device of the second type and allocate a second set of frequency resources of the resource block for communication with a second device of the second type. In some examples, the allocated resources include a plurality of resource element groups. In some examples, the plurality of resource element groups are rate matched around the first set of resource elements and the second set of resource elements.

In one example, a non-transitory computer-readable medium storing computer-executable code for communication. The code may be executable by a processor to allocate, in a downlink carrier including a plurality of resource blocks over a plurality of subframes, a first set of resource elements for CRS associated with communication with one or more communication devices of a first type. The code may also be executable by the processor to allocate resources of a resource block of the plurality of resource blocks to a narrow-band physical channel for communication with one or more communication devices of a second type, the allocated resources being rate-matched around the first set of resource elements and a second set of resource elements allocated to NB-CRS associated with communication with the one or more communication devices of the second type; and to transmit information to the one or more communication devices of the second type mapped to a subset of the allocated resources of the narrow-band physical channel.

In some examples, the code may also be executable by the processor to determine to rate-match the allocated resources around the first set of resource elements and the second set of resource elements based on a deployment mode of the narrow-band physical channel. In some examples, the deployment mode includes an in-band deployment mode. In some examples, the code may also be executable by the processor to transmit the information to the one or more communication devices of the second type based on a predetermined transmission mode. In some examples, the predetermined transmission mode includes transmit diversity based on a SFBC.

In some examples, the code may also be executable by the processor to allocate a first set of frequency resources of the resource block for communication with a first device of the second type and allocate a second set of frequency resources of the resource block for communication with a second device of the second type. In some examples, the allocated resources include a plurality of resource element groups. In some examples, the plurality of resource element groups are rate matched around the first set of resource elements and the second set of resource elements.

In one example, a method of communication at a wireless device is described. The method may include determining a deployment mode of a narrow-band physical channel, receiving information mapped to a subset of resources allocated to the narrow-band physical channel, determining a rate matching configuration associated with the subset of resources allocated to the narrow-band physical channel based on the deployment mode, and decoding the received information based on the rate matching configuration.

In some examples of the method, the deployment mode includes an in-band deployment mode. In some examples, the subset of resources allocated to the narrow-band physical channel are rate-matched around a first set of resource elements allocated to CRS and a second set of resource elements allocated to NB-CRS. In some examples, the deployment mode includes a standalone deployment mode or a guard band deployment mode. In some examples, the subset of resources allocated to the narrow-band physical channel are rate-matched around a set of resource elements allocated to NB-CRS. In some examples, the allocated resources include a plurality of resource element groups. In some examples, the plurality of resource element groups are rate-matched around a set of resource elements allocated to NB-CRS.

In one example, an apparatus for communication at a wireless device is described. The apparatus may include means for determining a deployment mode of a narrow-band physical channel, means for receiving information mapped to a subset of resources allocated to the narrow-band physical channel, means for determining a rate matching configuration associated with the subset of resources allocated to the narrow-band physical channel based on the deployment mode, and means for decoding the received information based on the rate matching configuration.

In some examples of the apparatus, the deployment mode includes an in-band deployment mode. In some examples, the subset of resources allocated to the narrow-band physical channel are rate-matched around a first set of resource elements allocated to CRS and a second set of resource elements allocated to NB-CRS. In some examples, the deployment mode includes a standalone deployment mode or a guard band deployment mode. In some examples, the subset of resources allocated to the narrow-band physical channel are rate-matched around a set of resource elements allocated to NB-CRS. In some examples, the allocated resources include a plurality of resource element groups. In some examples, the plurality of resource element groups are rate-matched around a set of resource elements allocated to NB-CRS.

In one example, another apparatus for communication at a wireless device is described. The apparatus may include a processor, memory in electronic communication with the processor, and instructions stored in the memory. The instructions may be executable by the processor to cause the apparatus to determine a deployment mode of a narrow-band physical channel, receive information mapped to a subset of resources allocated to the narrow-band physical channel, determine a rate matching configuration associated with the subset of resources allocated to the narrow-band physical channel based on the deployment mode, and decode the received information based on the rate matching configuration.

In some examples of the apparatus, the deployment mode includes an in-band deployment mode. In some examples, the subset of resources allocated to the narrow-band physical channel are rate-matched around a first set of resource elements allocated to CRS and a second set of resource elements allocated to NB-CRS. In some examples, the deployment mode includes a standalone deployment mode or a guard band deployment mode. In some examples, the subset of resources allocated to the narrow-band physical channel are rate-matched around a set of resource elements allocated to NB-CRS. In some examples, the allocated resources include a plurality of resource element groups. In some examples, the plurality of resource element groups are rate-matched around a set of resource elements allocated to NB-CRS.

In one example, a non-transitory computer-readable medium storing computer-executable code for communication is described. The code may be executable by a processor to determine a deployment mode of a narrow-band physical channel, receive information mapped to a subset of resources allocated to the narrow-band physical channel, determine a rate matching configuration associated with the subset of resources allocated to the narrow-band physical channel based on the deployment mode, and decode the received information based on the rate matching configuration.

In some examples of the non-transitory computer-readable medium, the deployment mode includes an in-band deployment mode. In some examples, the subset of resources allocated to the narrow-band physical channel are rate-matched around a first set of resource elements allocated to CRS and a second set of resource elements allocated to NB-CRS. In some examples, the deployment mode includes a standalone deployment mode or a guard band deployment mode. In some examples, the subset of resources allocated to the narrow-band physical channel are rate-matched around a set of resource elements allocated to NB-CRS. In some examples, the allocated resources include a plurality of resource element groups. In some examples, the plurality of resource element groups are rate-matched around a set of resource elements allocated to NB-CRS.

In one example, another method of communication at a wireless device is described. The method may include receiving a narrow-band physical control channel, and identifying, in the narrow-band physical control channel, a data transmission including a first data header and a data payload mapped to a set of resources of the narrow-band physical control channel having a same size as at least one format for control channel transmissions over the narrow-band physical control channel.

In some examples of the method, the first data header may have a different size than a second data header for transmissions of data via a narrow-band data channel allocated by control transmissions in the narrow-band physical control channel. In some examples, the data transmission may be identified by descrambling a cyclic redundancy check value of a decoded control transmission candidate with a data identifier. In some examples, the data transmission may be identified by performing a cyclic redundancy check for a decoded control transmission candidate with a cyclic redundancy check value having a different length than for identifying the at least one format for control channel transmissions. In some examples, the set of resources of the narrow-band physical control channel includes a plurality of resource element groups.

In one example, another apparatus for communication at a wireless device is described. The apparatus may include means for receiving a narrow-band physical control channel, and means for identifying, in the narrow-band physical control channel, a data transmission including a first data header and a data payload mapped to a set of resources of the narrow-band physical control channel having a same size as at least one format for control channel transmissions over the narrow-band physical control channel.

In some examples of the apparatus, the first data header may have a different size than a second data header for transmissions of data via a narrow-band data channel allocated by control transmissions in the narrow-band physical control channel. In some examples, the data transmission may be identified by descrambling a cyclic redundancy check value of a decoded control transmission candidate with a data identifier. In some examples, the data transmission may be identified by performing a cyclic redundancy check for a decoded control transmission candidate with a cyclic redundancy check value having a different length than for identifying the at least one format for control channel transmissions. In some examples, the set of resources of the narrow-band physical control channel includes a plurality of resource element groups.

In one example, another apparatus for communication at a wireless device is described. The apparatus may include a processor, memory in electronic communication with the processor, and instructions stored in the memory. The instructions may be executable by the processor to receive a narrow-band physical control channel, and to identify, in the narrow-band physical control channel, a data transmission including a first data header and a data payload mapped to a set of resources of the narrow-band physical control channel having a same size as at least one format for control channel transmissions over the narrow-band physical control channel.

In some examples, the first data header may have a different size than a second data header for transmissions of data via a narrow-band data channel allocated by control transmissions in the narrow-band physical control channel. In some examples, the data transmission may be identified by descrambling a cyclic redundancy check value of a decoded control transmission candidate with a data identifier. In some examples, the data transmission may be identified by performing a cyclic redundancy check for a decoded control transmission candidate with a cyclic redundancy check value having a different length than for identifying the at least one format for control channel transmissions. In some examples, the set of resources of the narrow-band physical control channel includes a plurality of resource element groups.

In one example, another non-transitory computer-readable medium storing computer-executable code for communication is described. The code may be executable by a processor to receive a narrow-band physical control channel, and to identify, in the narrow-band physical control channel, a data transmission including a first data header and a data payload mapped to a set of resources of the narrow-band physical control channel having a same size as at least one format for control channel transmissions over the narrow-band physical control channel.

In some examples, the first data header may have a different size than a second data header for transmissions of data via a narrow-band data channel allocated by control transmissions in the narrow-band physical control channel. In some examples, the data transmission may be identified by descrambling a cyclic redundancy check value of a decoded control transmission candidate with a data identifier. In some examples, the data transmission may be identified by performing a cyclic redundancy check for a decoded control transmission candidate with a cyclic redundancy check value having a different length than for identifying the at least one format for control channel transmissions. In some examples, the set of resources of the narrow-band physical control channel includes a plurality of resource element groups.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, and apparatuses for configuring narrow-band (NB) physical channels. The techniques may be variously applied by base stations that transmit narrow-band physical channels and user equipments (UEs) that receive narrow-band physical channels. In some examples, described techniques enable a base station to rate match narrow-band physical channels around reference signals associated with both narrow-band and other communication. In some examples, described techniques enable a wireless device (e.g., a UE) to determine a location of a downlink data transmission in a narrow-band downlink data channel based on a resource mapping between resources of a narrow-band physical control channel and a narrow-band downlink data channel. In some examples, described techniques enable a wireless device (e.g., a UE) to receive downlink data transmissions mapped to resources usable for control channel transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
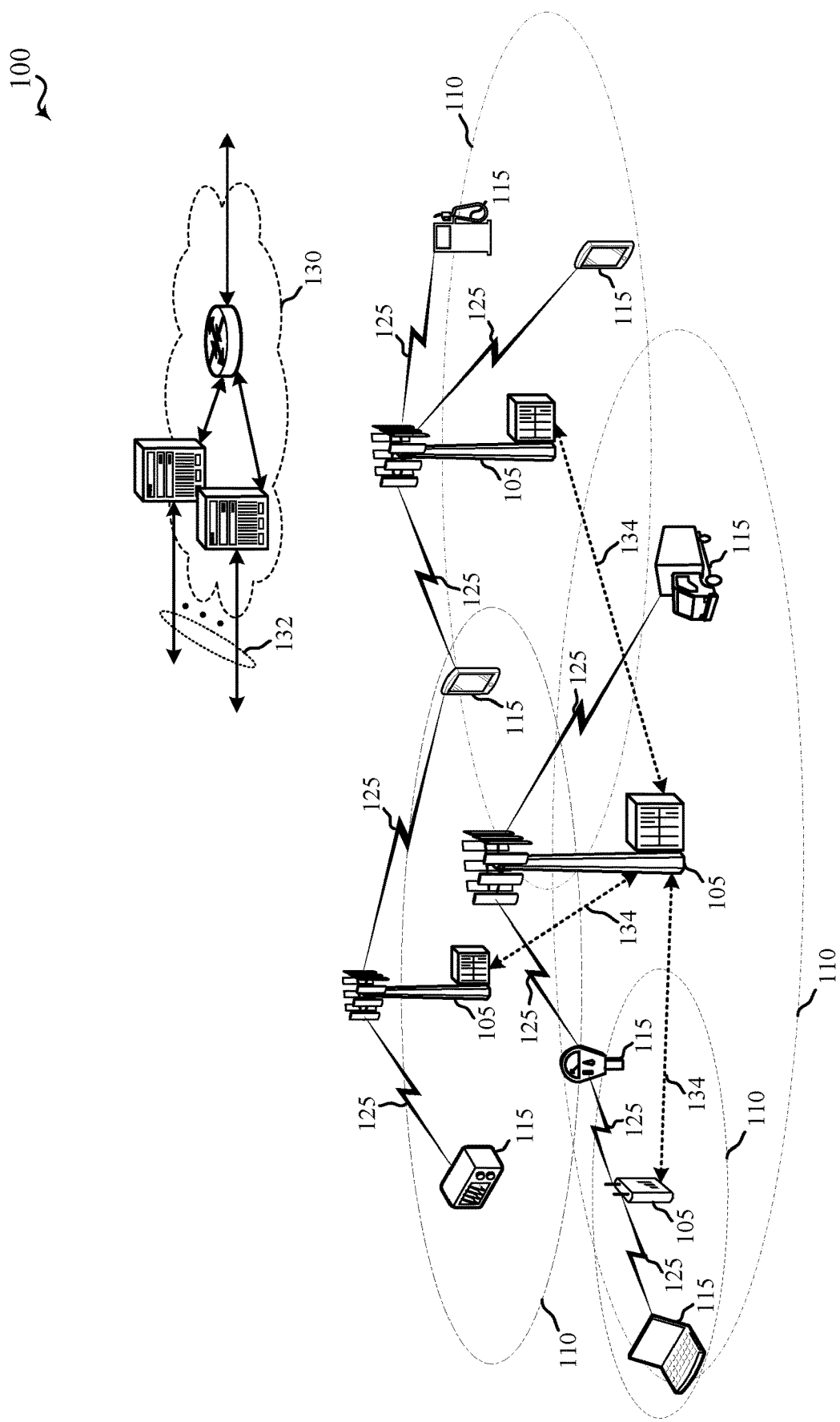
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors (not shown) making up a portion of the coverage area. The wireless communication system 100 may include base stations 105 of different types (e.g., macro or small cell base stations). There may be overlapping geographic coverage areas 110 for different technologies.

In some examples, the wireless communication system 100 may include an LTE/LTE-A network and may employ narrow-band communication techniques, as described below. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a NB-LTE device, a M2M device, a machine type communication (MTC) device, an enhanced MTC (eMTC) device, a NB-Internet of Things (IoT) device or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions. The communication links 125 may include, for example, resources for wide-band physical control channels (e.g., a physical downlink control channel (PDCCH) or enhanced PDCCH (ePDCCH)), wide-band downlink data channels (e.g., a physical downlink shared channel (PDSCH)), narrow-band physical control channels (e.g., a narrow-band PDCCH (NB-PDCCH)), and narrow-band downlink data channels (e.g., an NB-PDSCH).

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

Figure 2:
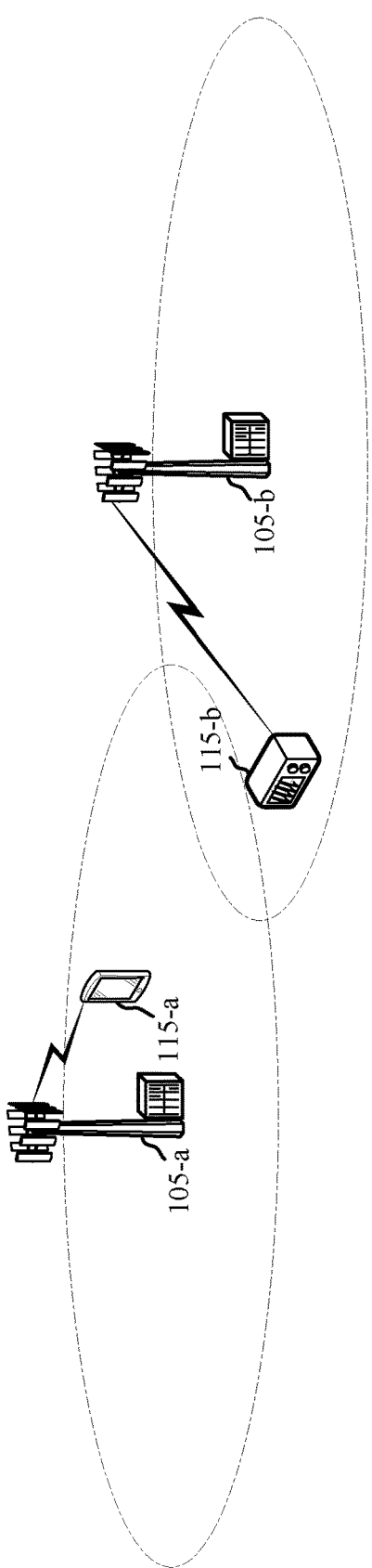
FIG. 2 shows an example of a wireless communication system, in accordance with various aspects of the present disclosure.

FIG. 2 shows an example of a wireless communication system 200, in accordance with various aspects of the present disclosure. The wireless communication system 200 may be an example of a portion of the wireless communication system 100, and may include a first base station 105-a, a second base station 105-b, a first UE 115-a, and a second UE 115-b.

In some examples, the first base station 105-a may communicate with the first UE 115-a using wide-band communication, and the second base station 105-b may communicate with the second UE 115-b using narrow-band communication. The wide-band communication and narrow-band communication may occur within the same radio frequency spectrum, and thus, it may be desirable to allocate resources for wide-band communication and narrow-band communication in a manner that enables co-existence of the devices communicating using wide-band communication and the devices using narrow-band communication.

In some examples of the wireless communication system 200, the first base station 105-a may be additionally capable of narrow-band communication, or the second base station 105-b may be additionally capable of wide-band communication. Similarly, the first UE 115-a may be additionally capable of narrow-band communication, or the second UE 115-b may be additionally capable of wide-band communication.

Figure 3:
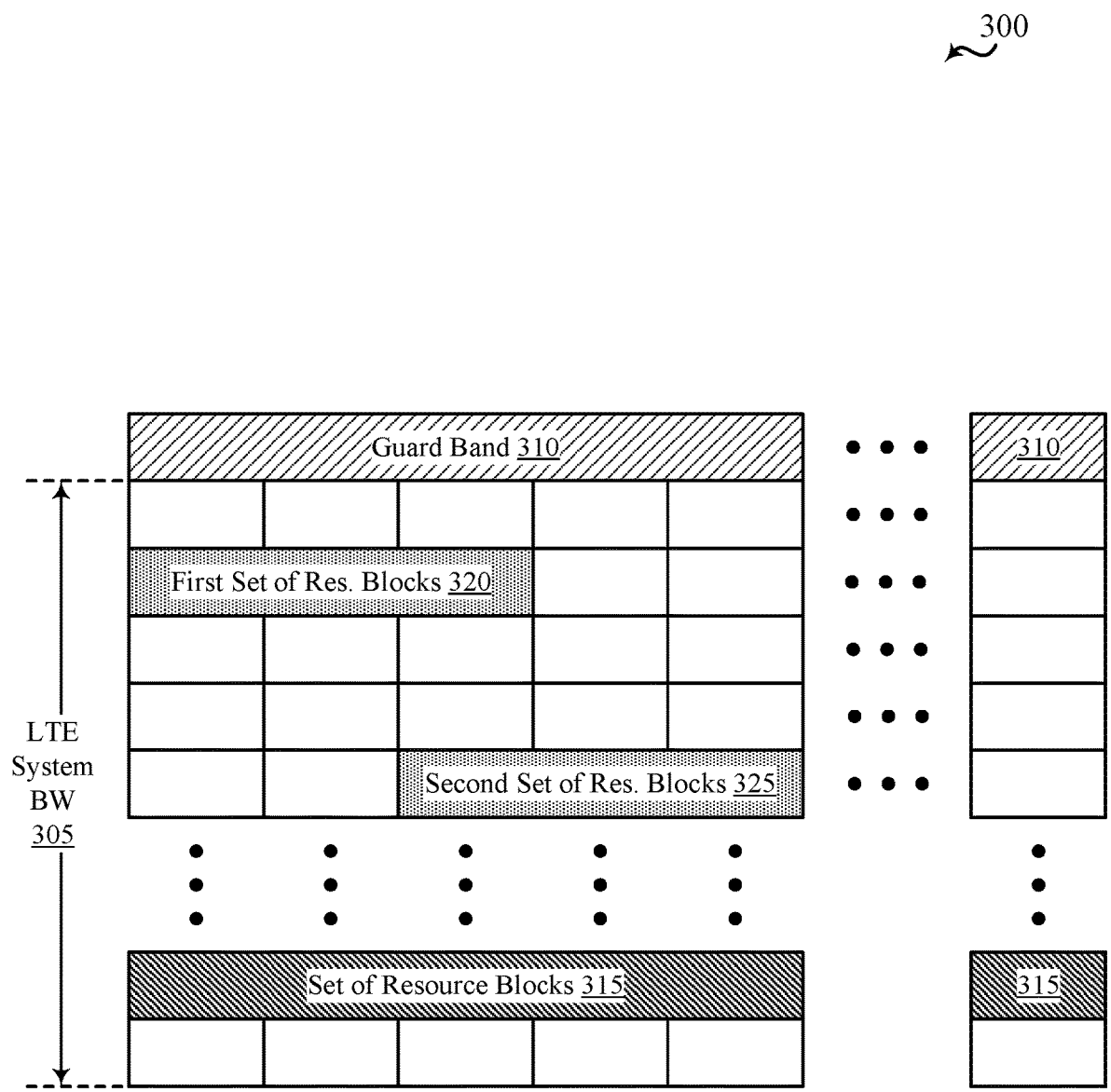
FIG. 3 shows time and frequency resource allocations that provide co-existence between wide-band communication and narrow-band communication, in accordance with various aspects of the present disclosure.

FIG. 3 shows time and frequency resource allocations 300 that provide co-existence between wide-band communication and narrow-band communication, in accordance with various aspects of the present disclosure. The wide-band communication may occur between a first base station and a set of wide-band-capable wireless devices (e.g., UEs). The narrow-band communication may occur between the first base station (or a second base station) and a set of narrow-band-capable wireless devices (e.g., UEs). A wireless device may be included in the set of wide-band-capable wireless devices, the set of narrow-band-capable wireless devices, or both the set of wide-band-capable wireless devices and the set of narrow-band-capable wireless devices. In some examples, the first base station and second base station may be examples of the base stations 105 described with reference to FIGS. 1 and 2, and the wide-band-capable wireless devices and narrow-band-capable wireless devices may be examples of the UEs 115 described with reference to FIGS. 1 and 2.

To provide co-existence between wide-band communication and narrow-band communication, time and frequency resources may be allocated for narrow-band communication within a resource allocation framework based at least in part on wide-band (e.g., LTE/LTE-A) orthogonal frequency division multiplexing (OFDM) numerology and resource blocks. In a first example of narrow-band resource allocation, out-of-band LTE/LTE-A resources (i.e., resources located outside an LTE/LTE-A system bandwidth 305) may be allocated for narrow-band communication. The out-of-band LTE/LTE-A resources allocated for narrow-band communication may be located in dedicated spectrum resources (e.g., re-using a 200 KHz GSM carrier, etc.) or in a guard band 310 adjacent the LTE/LTE-A system bandwidth 305. In second and third examples of narrow-band resource allocation, in-band LTE/LTE-A resources (i.e., resources located inside the LTE/LTE-A system bandwidth 305) may be allocated for narrow-band communication. In the second example, the in-band LTE/LTE-A resources allocated for narrow-band communication may be located in a set of resource blocks 315 spanning a same subset of frequency resources in each subframe. This may be referred to as a dedicated in-band narrow-band deployment, because a set of LTE/LTE-A frequency resources are dedicated to narrow-band communication, and narrow-band communication is not multiplexed with LTE/LTE-A communication in the time domain. In the third example, the in-band LTE resources allocated for narrow-band communication may be located in different resource bocks in different subframes (e.g., a first set of resource blocks 320 spanning a first subset of frequency resources may be allocated for narrow-band communication during each subframe in a first set of subframes (e.g., during subframes SF0, SF1, and SF2); and a second set of resource blocks 325 spanning a second subset of frequency resources may be allocated for narrow-band communication during each subframe in a second set of subframes (e.g., during subframes SF2, SF3, and SF4).

In some examples, a base station may communicate with one or more wireless devices (e.g., UEs) using a coverage enhancement (CE) level, in which a greater transmit power or transmission time interval (TTI) bundling may be used to improve reception at a receiving device (e.g., a base station or UE). TTI bundling may enable repetition of a transmission, which may improve detection or decoding of the transmission. In some examples, a plurality of CE levels (e.g., 4 CE levels), associated with different transmit powers or combinations of transmit power and TTI bundling, may be defined.

In some examples, cost or other factors may dictate a narrow-band wireless device (e.g., a NB-IoT UE) having a very low complexity. Lower complexity may be achieved, in part and by way of example, by using a single transmission mode for a narrow-band downlink data channel (e.g., for an NB-PDSCH), or by coding the narrow-band downlink data channel using a tail-biting convolutional code (TBCC) instead of a turbo-code (TC). Lower complexity may also be achieved, in part and by way of example, by using a same CE level or MCS for both a narrow-band physical control channel (e.g., a NB-PDCCH) and a narrow-band downlink data channel (e.g., an NB-PDSCH).

Physical control channels currently used in LTE/LTE-A networks include a PDCCH or an ePDCCH. A PDCCH uses cell specific reference signals (CRS) for demodulation with space frequency block coding (SFBC) precoding and is transmitted in the first OFDM symbol period (and in some examples, the first few OFDM symbol periods) of every resource block across the system bandwidth. An LTE/LTE-A PDCCH format may not be desirable for a narrow-band physical control channel because of its time division multiplexing (TDM) structure. An ePDCCH is demodulation reference signal (DMRS)-precoding based and is transmitted in a few tones across the entirety of a resource block (except for OFDM symbol periods used to transmit a PDCCH). An ePDCCH is currently used for eMTC communication, but may not be desirable for some narrow-band communications because it involves DMRS-based channel estimation.

In some examples of narrow-band communication, different transmission modes may be used for a narrow-band physical control channel (e.g., a NB-PDCCH) and a narrow-band downlink data channel (e.g., an NB-PDSCH). For example, precoder cycling with DMRS demodulation may be used for a narrow-band physical control channel, and SFBC with CRS demodulation may be used for a narrow-band downlink data channel. Alternatively, and as a further example, a narrow-band physical control channel may be CRS-based with SFBC or precoder cycling, and a narrow-band downlink data channel may use SFBC or precoder cycling with CRS-based demodulation.

Multiplexing of narrow-band channels, resource grants, and wireless devices (e.g., UEs) may be performed in different ways. In some cases, multiplexing may be performed using frequency division multiplexing (FDM) techniques. In a first example, some tones may be allocated to a narrow-band physical control channel, and other tones may be allocated to a narrow-band downlink data channel. In a second example, some tones may be allocated to a first grant for a first wireless device, and other tones may be allocated to a second grant for a second wireless device. In other cases, multiplexing may be performed using time division multiplexing (TDM) techniques. In a first example, some symbol periods may be allocated to a narrow-band physical control channel, and other symbol periods may be allocated to a narrow-band downlink data channel. In a second example, some symbol periods may be allocated to a first grant for a first wireless device, and other symbol periods may be allocated to a second grant for a second wireless device.

Additionally or alternatively, multiplexing may be performed using resource element group (REG) or enhanced REG (eREG) techniques. In a first example, some of the REGs may be allocated to a narrow-band physical control channel, and other REGs may be allocated to a narrow-band downlink data channel. In a second example, some of the REGs may be allocated to a first grant for a first wireless device, and other REGs may be allocated to a second grant for a second wireless device. When using REG or eREG techniques, allocations to a narrow-band physical control channel and a narrow-band downlink data channel may be static or semi-static (e.g., predefined, in a system information block (SIB), or in RRC signaling) or dynamic (e.g., with a narrow-band physical control channel being blindly decoded, and with downlink control information in a control channel transmission indicating the REG or control channel element (CCE) used by a corresponding downlink data transmission).

Figure 4:
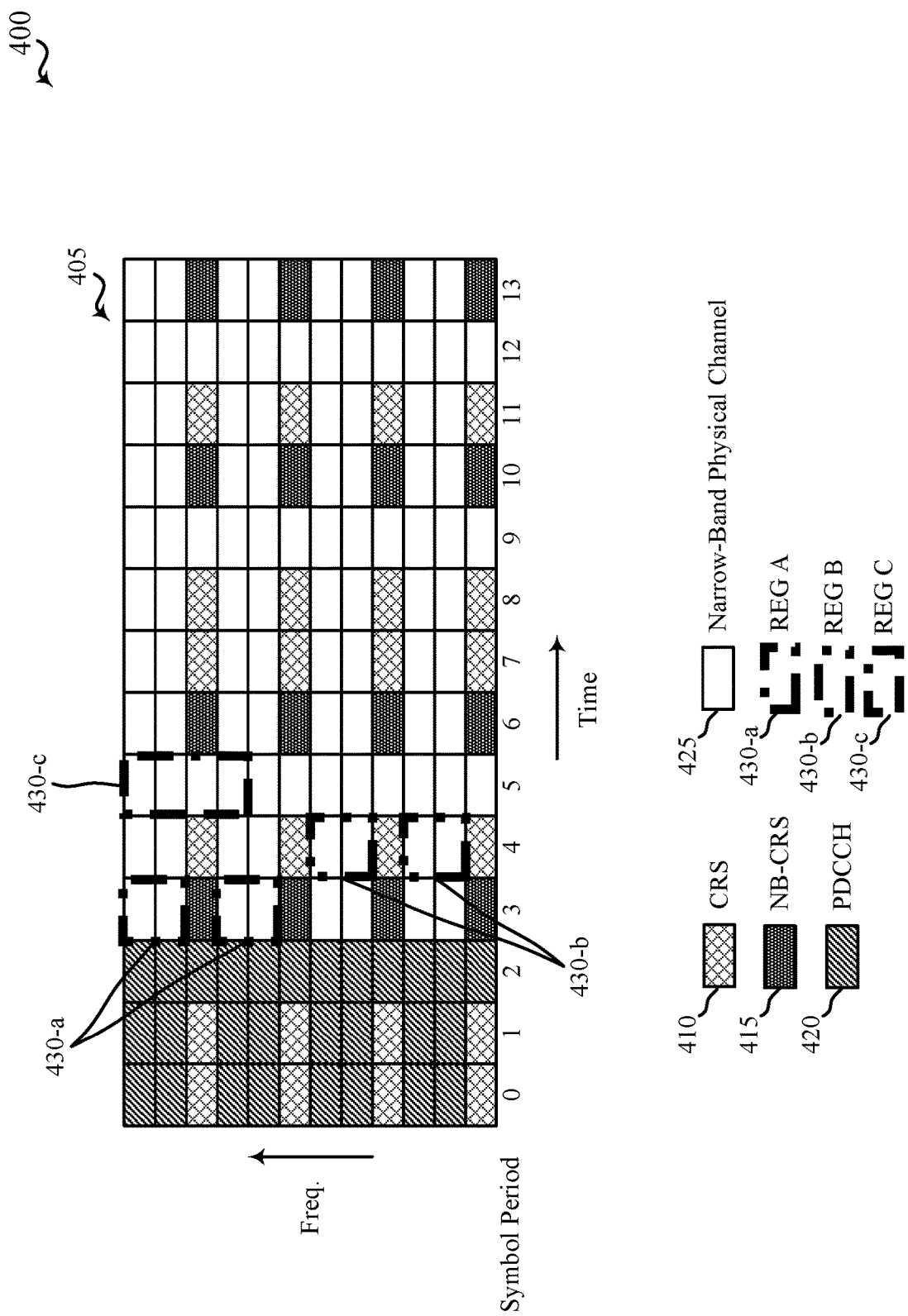
FIG. 4 shows a time and frequency resource allocation, in accordance with various aspects of the present disclosure.

FIG. 4 shows a time and frequency resource allocation 400 in an in-band deployment, in accordance with various aspects of the present disclosure. The time and frequency resource allocation 400 shows an example of how resources of a resource block 405 may be allocated to a narrow-band physical channel and rate-matched around a number of reference signals. The narrow-band physical channel may include a narrow-band physical control channel (e.g., a NB-PDCCH) or a narrow-band downlink data channel (e.g., an NB-PDSCH). The resource block 405 may be one of a plurality of resource blocks provided in a downlink carrier over a plurality of transmission intervals (e.g., subframes). By way of example, the resource block 405 may be a resource block that is in-band with respect to an LTE/LTE-A carrier, as described with reference to FIG. 3.

By way of further example, a base station may allocate a first set of resource elements 410 of the resource block 405 to one or more CRS associated with communication with one or more communication devices of a first type (e.g., LTE/LTE-A communication devices). The CRS associated with communication with the one or more communication devices of the first type may or may not be recognized (or be usable) by one or more communication devices of a second type (e.g., narrow-band communication devices). The base station may also allocate a second set of resource elements 415 of the resource block 405 to one or more NB-CRS associated with communication with the one or more communication devices of the second type. In some examples, the base station may further allocate a third set of resource elements 420 of the resource block 405 to a wide-band physical channel (e.g., a PDCCH for the one or more communication devices of the first type). The wide-band physical channel spans three symbol periods of the resource block 405, but in alternative examples could span more or fewer symbol periods.

A base station may allocate resource elements 425 of the resource block 405 that have not been allocated for other purposes to a narrow-band physical channel for communication with the one or more communication devices of the second type. The allocated resources may include a plurality of REGs 430, which in some examples may be allocated as groups of REGs (e.g., as control channel elements (CCEs)). The allocated resources (e.g., REGs or CCEs) may be rate-matched around the resource elements allocated to the reference signals. For example, REG B 430-b may be rate-matched around the first set of resource elements 410 allocated to the CRS, while REG A 430-a may be rate-matched around the second set of resource elements 415 allocated to the NB-CRS. REG C 430-c may not overlap with any CRS or NB-CRS resources and may not be rate-matched. When each REG includes four resource elements, three REGs may be allocated to the narrow-band physical channel in each of symbol periods 5, 9, and 12, and two REGs may be allocated to the narrow-band physical channel in each of symbol periods 3, 4, 6, 7, 8, 10, 11, and 13.

In some examples, information (e.g., a control channel transmission or a downlink data transmission) may be mapped to a subset (or all) of the resources allocated to the narrow-band physical channel and transmitted to the one or more communication devices of the second type. In some examples, information may be mapped to different subcarriers using FDM techniques, or information may be mapped to different symbol periods using TDM techniques. In other examples, information may be mapped according to REGs or CCEs. In some examples, different information may be mapped to different subsets of the resources allocated to the narrow-band physical channel for transmission to different UEs. For example, information may be mapped to a subset of resources in the time domain for each UE, a subset of resources in the frequency domain for each UE, or combinations of time-frequency resources (e.g., different REGs or CCEs for each UE). As discussed below, REGs 430 may have precoder cycling applied (e.g., sequential REGs may be precoded differently according to a set of precoders, etc.).

When resources of the resource block 405 are allocated to a narrow-band physical control channel (e.g., a NB-PDCCH), the REGs of the narrow-band physical control channel may be defined similarly to the REGs of a PDCCH, as shown, or similarly to the enhanced REGs (eREGs) of an ePDCCH, but without rate matching around DMRS (not shown). When the REGs of the narrow-band physical control channel are defined similarly to the REGs of a PDCCH transmitted using some or all of the third set of resource elements 420, one or more symbol periods of REGs defined by the third set of resource elements 420 may be re-allocated to the narrow-band physical control channel when not needed for the PDCCH.

Figure 5:
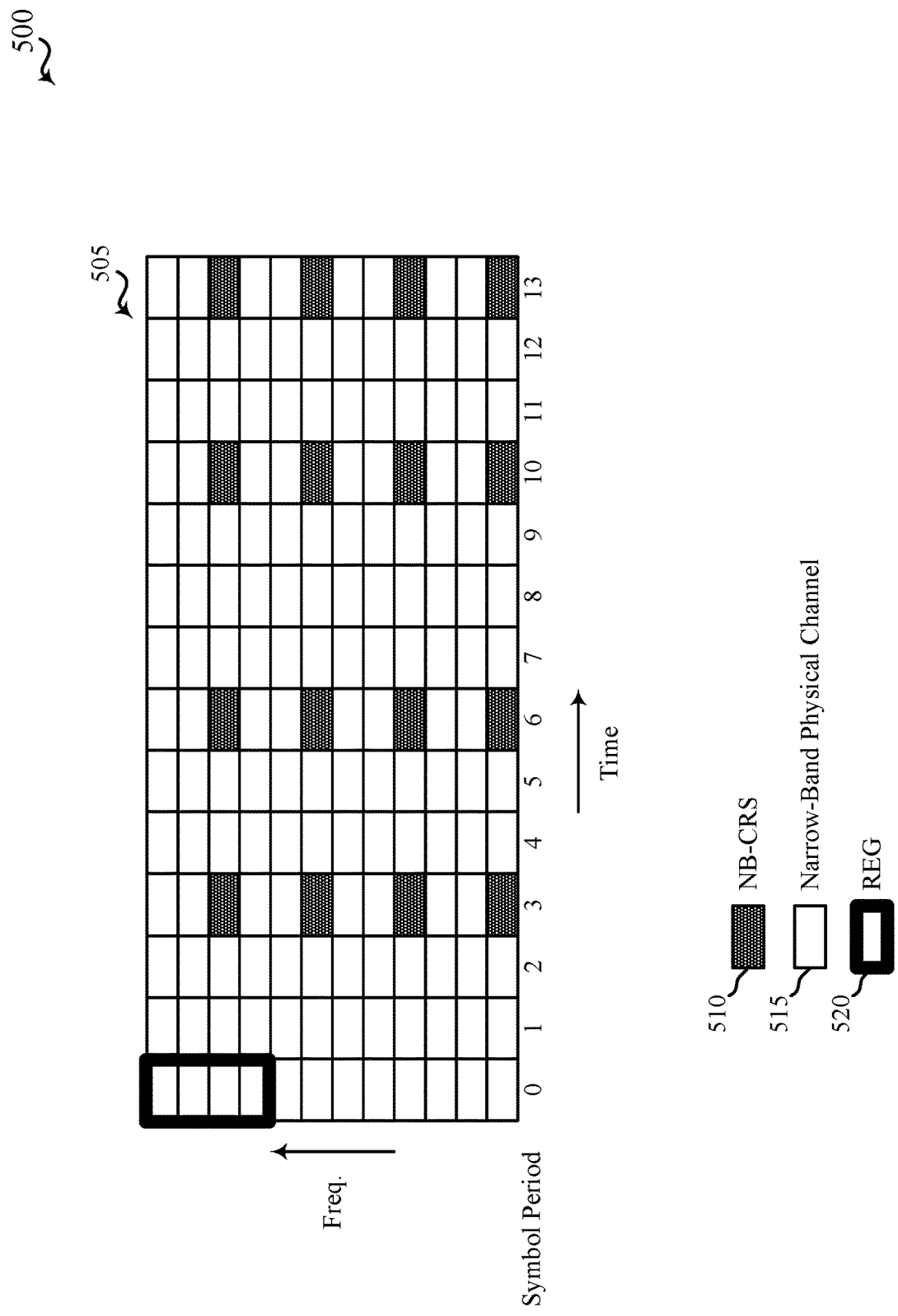
FIG. 5 shows a time and frequency resource allocation, in accordance with various aspects of the present disclosure.

FIG. 5 shows a time and frequency resource allocation 500 in a standalone deployment or a guard band deployment, in accordance with various aspects of the present disclosure. The time and frequency resource allocation 500 shows an example of how resources of a resource block 505 may be allocated to a narrow-band physical channel and rate-matched around a number of reference signals. The narrow-band physical channel may include a narrow-band physical control channel (e.g., a NB-PDCCH) or a narrow-band downlink data channel (e.g., an NB-PDSCH). The resource block 505 may be one of a plurality of resource blocks provided in a downlink carrier over a plurality of transmission intervals (e.g., subframes). By way of example, the resource block 505 may be a resource block of a standalone deployment of a narrow-band physical channel (e.g., not in-band of an LTE/LTE-A carrier), as described with reference to FIG. 3.

By way of further example, a base station may allocate a set of resource elements 510 of the resource block 505 to one or more NB-CRS associated with communication with one or more narrow-band communication devices. Because the resource block 505 is a standalone resource block with respect to an LTE/LTE-A radio frequency spectrum band, the base station may not allocate any resource elements of the resource block 505 to CRS or a wide-band physical channel, as was described with reference to FIG. 4.

A base station may allocate resource elements 515 of the resource block 505 that have not been allocated for other purposes to a narrow-band physical channel for communication with the narrow-band communication devices. The allocated resources may include a plurality of REGs 520, which in some examples may be allocated as groups of REGs (e.g., as CCEs). The allocated resources (e.g., REGs or CCEs) may be rate-matched around the set of resource elements 510 allocated to the NB-CRS. When each REG includes four resource elements, three REGs may be allocated to the narrow-band physical channel in each of symbol periods 0, 1, 2, 4, 5, 7, 8, 9, 11, and 12, and two REGs may be allocated to the narrow-band physical channel in each of symbol periods 3, 6, 10, and 13.

In some examples, information (e.g., a control channel transmission or a downlink data transmission) may be mapped to a subset (or all) of the resources allocated to the narrow-band physical channel and transmitted to the one or more narrow-band communication devices. In some examples, information may be mapped to different subcarriers using FDM techniques, or information may be mapped to different symbol periods using TDM techniques. In other examples, information may be mapped according to REGs or CCEs. In some examples, different information may be mapped to different subsets of the resources allocated to the narrow-band physical channel for transmission to different UEs. For example, information may be mapped to a subset of resources in the time domain for each UE, a subset of resources in the frequency domain for each UE, or combinations of time-frequency resources (e.g., different REGs or CCEs for each UE).

When resources of the resource block 505 are allocated to a narrow-band physical control channel (e.g., a NB-PDCCH), the REGs of the narrow-band physical control channel may be defined similarly to the REGs of a PDCCH (not shown), or similarly to the REGs of an ePDCCH, but without rate matching around DMRS (not shown).

When resources of the resource blocks 405 and 505 (described with reference to FIGS. 4 and 5) are allocated to a narrow-band physical control channel (e.g., a NB-PDCCH), a base station may indicate to wireless devices (e.g., narrow-band communication devices) a start of a search space for control channel transmissions. The resource elements that are candidate starting positions for control channel transmissions, and/or the aggregation levels of control channel transmissions, may vary based on factors such as deployment mode (e.g., standalone, guard band, or in-band, as described with reference to FIG. 3) or coverage enhancement level. In some cases, the aggregation levels of control channel transmissions may be associated with transmissions on varying subsets of resources (e.g., tones, symbol periods, or REGs). For example, aggregation level 1 may be associated with transmissions on a first subset of resources or a second set of resources, and aggregation level 2 may be associated with transmissions on a set of resources spanning the first subset of resources and the second subset of resources. When resources of the resource blocks 405 and 505 are allocated to a narrow-band downlink data channel (e.g., an NB-PDSCH), the location of a downlink data transmission may be identified in a resource grant, or may be based on a linkage of control and data resources, as described with reference to FIG. 6.

In some examples, a common transmission mode may be used for both a narrow-band physical control channel (e.g., a NB-PDCCH) and a narrow-band downlink data channel (e.g., an NB-PDSCH). In some examples, the common transmission mode may include an SFBC transmission mode. An SFBC transmission mode may be useful in that a UE receives power from multiple (e.g., two) antennas at the same time. However, an SFBC transmission mode requires pairs of resource elements, which can be in limited supply when rate matching around certain other channels or signals (e.g., a channel state information reference signal (CSI-RS)). In other examples, the common transmission mode may include a precoder cycling transmission mode, in which information mapped to sequential resource elements or REGs may be precoded according to different precoders of a set of precoders. A precoder cycling transmission mode may, in some examples, be based on CRS and NB-CRS. In one example of precoder cycling, each sequential resource element or REG may use a different transmit antenna (e.g., the set of precoders may include the precoders [1,0] and [0,1]). In another example of precoder cycling, a set of precoders may be defined in a specification, in a SIB, or in RRC signaling, and a base station may cycle through the set of precoders.

Figure 6:
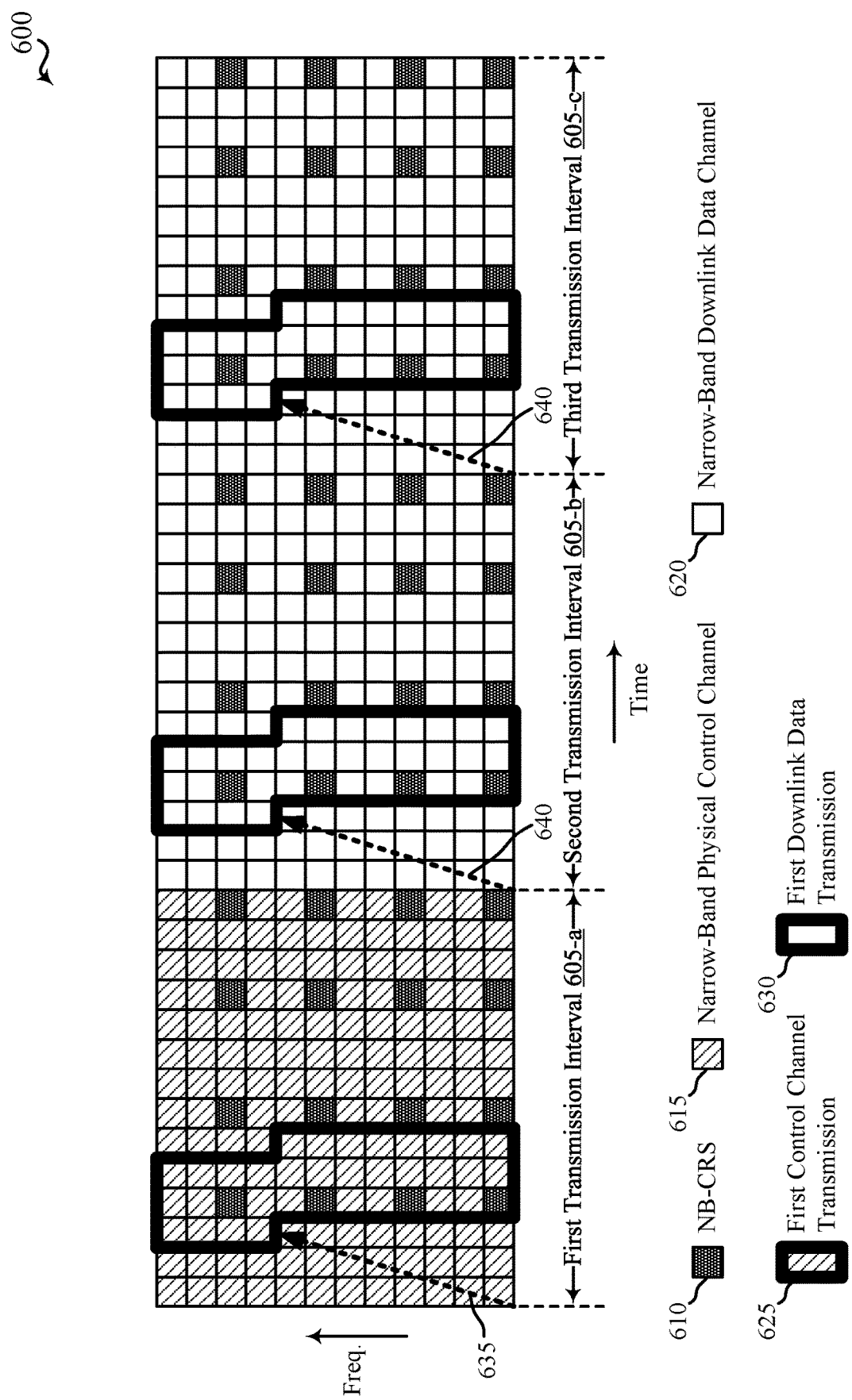
FIG. 6 shows a time and frequency resource allocation, in accordance with various aspects of the present disclosure.

FIG. 6 shows a time and frequency resource allocation 600, in accordance with various aspects of the present disclosure. The time and frequency resource allocation 600 shows an example of linkage between resources of a narrow-band physical control channel (e.g., a NB-PDCCH) and resources of a narrow-band downlink data channel (e.g., an NB-PDSCH). The narrow-band physical control channel and narrow-band downlink data channel may be variously deployed as standalone, guard band, or in-band channels, as described with reference to FIG. 3. By way of example, the narrow-band physical control channel is shown to be allocated resources in a first transmission interval 605-a (e.g., a first subframe), and the narrow-band downlink data channel is shown to be allocated resources in a second transmission interval 605-b, and a third transmission interval 605-c. The transmission intervals may follow each other in time. In some examples, the second transmission interval 605-b may be separated from the first transmission interval 605-a by one or more other transmission intervals (not shown). In some examples, the narrow-band physical control channel may be allocated resources in more than one transmission interval (e.g., TTI bundling, etc.), or the narrow-band downlink data channel may be allocated resources in more or fewer transmission intervals (e.g., TTI bundling, etc.). In some examples, part or all of the narrow-band downlink data channel may occupy a portion of the first transmission interval (not shown).

In some examples, some of the resource elements of the transmission intervals 605 may be used by a base station to transmit one or more reference signals, one or more other control channels (e.g., a PDCCH), and/or one or more other signals. For example, a base station may transmit a CRS or a NB-CRS 610 using some of the resource elements of the transmission intervals 605, as described with reference to FIGS. 4 and 5. Other resource elements of the transmission intervals 605 may be used by the base station to transmit the narrow-band physical control channel and the narrow-band downlink data channel.

By way of example, FIG. 6 shows a narrow-band physical control channel being transmitted on 152 resource elements 615 of the first transmission interval 605-a. In some examples, the 152 resource elements may be allocated to 38 REGs or 4 CCEs. Resource elements, REGs, CCEs, or other transmission units of the narrow-band physical control channel may be allocated to the same or different UEs. In some examples, transmissions to two or more UEs may be multiplexed within the first transmission interval 605-a.

By way of example, FIG. 6 also shows a narrow-band downlink data channel being transmitted on 152 resource elements 620 of each of the second transmission interval 605-b and the third transmission interval 605-c. Similarly to the resource elements on which the narrow-band physical control channel is transmitted, the resource elements of the narrow-band downlink data channel may be allocated to 38 REGs or 4 CCEs.

A resource mapping may be established between control channel transmissions in the narrow-band physical control channel and downlink data transmissions in the narrow-band downlink data channel. In some examples, the resource mapping may include a mapping between a first resource index 635 of a control channel transmission in the narrow-band physical control channel and a second resource index 640 of a downlink data transmission in the narrow-band downlink data channel. In some examples, the first resource index 635 may be determined based on a deployment mode of the narrow-band physical control channel (e.g., based on one of the deployment modes described with reference to FIG. 3). In some examples, the first resource index 635 may include a first number of REGs that the control channel transmission is offset in the narrow-band physical control channel, and the second resource index 640 may include a second number of REGs that the downlink data transmission is offset in the narrow-band downlink data channel. In FIG. 6, there is shown a first control channel transmission 625 having a first resource index 635 offset by 8 REGs (of 4 resource elements each), and a corresponding (i.e., linked) first downlink data transmission 630 having a second resource index 640 of 8 REGs. In some examples, as shown, the first resource index 635 and the second resource index 640 may be the same (e.g., the first resource index and the second resource index may each indicate a same offset or same number of REGs). In some examples, the first resource index 635 and the second resource index 640 may be different. In some examples, a resource index may indicate an offset in terms of a transmission unit other than a number of REGs (e.g., a number of REs or a number of CCEs). A resource index may be determined based on a UE identifier and other mapping parameters conveyed by the base station (e.g., in system information, etc.).

In some examples, a control channel transmission may include an indicator of a resource grant for a corresponding (i.e., linked) downlink data transmission. An indicator of a resource grant may include or be based on, for example, an identifier of a wireless device, a transport block (TB) size of a downlink data transmission, a number of subframes of the downlink data transmission (e.g., a number of transmission intervals in which the downlink data transmission is repeated), a modulation and coding scheme (MCS) for the downlink data transmission, or a combination thereof. In some examples, the resource grant does not include information indicating a location of the grant in the narrow-band physical data channel. In some examples, a resource grant may be inferred from (or implicit in) the existence of the preceding information. The transmission parameters of a downlink data transmission (e.g., a TB size of the downlink data transmission, a number of subframes of the downlink data transmission, or an MCS for the downlink data transmission) may be the same as, or different from, corresponding transmission parameters of a control channel transmission.

In some examples, a wireless device (e.g., a UE) may identify a control channel transmission based on a blind decoding of the narrow-band physical control channel. Upon identifying a control channel transmission, the wireless device may then identify a corresponding (i.e., linked) downlink data transmission based on information included in the control channel transmission (including the location of the control channel transmission) and a mapping between control channel transmissions and downlink data transmissions.

When a narrow-band physical control channel (e.g., a NB-PDCCH) and a narrow-band downlink data channel (e.g., an NB-PDSCH) use a same MCS, and when a downlink data transmission is sufficiently small, the downlink data transmission may be transmitted using resources usable for the narrow-band physical control channel. For example, if a wireless device (e.g., a UE) is monitoring a search space for a control channel transmission (e.g., a downlink control information (DCI)) having a size M (including cyclic redundancy check (CRC) bits), a downlink data transmission of a narrow-band downlink data channel, having a same or smaller size as a control channel transmission of the narrow-band downlink data channel, may be transmitted on a set of resources otherwise usable for the control channel transmission.

In some examples, a downlink data transmission may include a data header and a data payload, and a base station may map the downlink data transmission (e.g., the data header, data payload, and associated CRC information) to a set of resources of a narrow-band physical control channel, which set of resources has a same size as a format for a control channel transmission (e.g., including CRC information) over a narrow-band physical control channel. In some examples, the set of resources to which the downlink data transmission is mapped may include a set of (e.g., one or more of) REGs.

To enable a wireless device (e.g., a UE) to identify a downlink data transmission mapped to a set of resources otherwise usable for a control channel transmission, a base station may alter CRC scrambling for the downlink data transmission or alter a CRC size for the downlink data transmission. For example, a base station may introduce a data identifier (e.g., a data ratio network temporary identifier (RNTI)) into the CRC scrambling for the downlink data transmission. A wireless device that decodes a transmission may determine whether the CRC value for the transmission is associated with a control-RNTI or a data-RNTI, to determine whether the transmission is a control channel transmission of a downlink data transmission. Alternatively or additionally, and as another example, the base station may increase the CRC size for the downlink data transmission. However, to keep the total size of the downlink data transmission the same size as a control channel transmission, the base station may reduce the payload size of the downlink data transmission. For example, if the control channel transmission has a CRC size of 16 bits, and the downlink data transmission has a CRC size of 24 bits, the payload of the downlink data transmission may be 8 bits smaller than the payload of the control channel transmission. In some examples, a wireless device may perform a single TBCC decode for a transmission, and then check the CRC size (possibly scrambled) to determine whether the transmission is a control channel transmission of a downlink data transmission.

In some examples, a downlink data transmission mapped to a set of resources otherwise usable for a control channel transmission may have a header that is a different size than a header used for transmissions of data via a narrow-band data channel (e.g., transmissions of data via a narrow-band data channel allocated by control transmissions in a narrow-band physical control channel). For example, the header of a downlink data transmission mapped to a set of resources otherwise usable for a control channel transmission may have a smaller header than a header used for transmissions of data via a narrow-band data channel. The smaller header may help to maximize the size of the data payload of the downlink data transmission. In some examples, the smaller header may have a reduced payload field (indicating a fixed payload size (e.g., TB size) or a small number of hypotheses), a reduced logical channel identifier (LCID) field (indicating a fixed LCID or small number of LCIDs), no F field (e.g., because the payload field may be constant or semi-static), and/or no reserved bits or extension bits.

Figure 7:
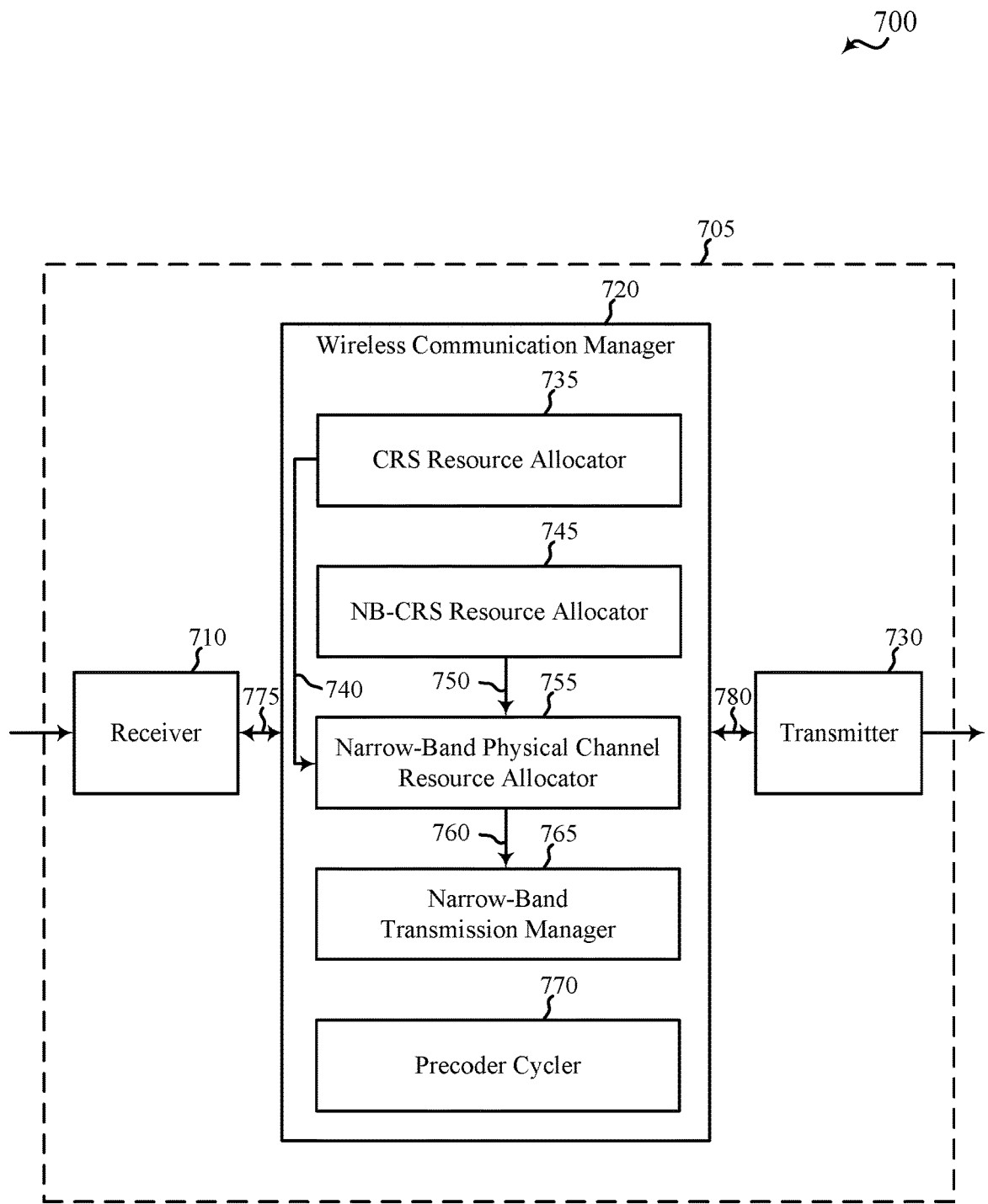
FIG. 7 shows a block diagram of a device for use in wireless communication, in accordance with various aspects of the present disclosure.

FIG. 7 shows a block diagram 700 of a device 705 for use in wireless communication, in accordance with various aspects of the present disclosure. The device 705 may be an example of aspects of one or more of the base stations 105 described with reference to FIGS. 1 and 2. The device 705 may also be or include a processor. The device 705 may include a receiver 710, a wireless communication manager 720, or a transmitter 730. Each of these components may be in communication with each other. For example, receiver 710 may pass information 775 to wireless communication manager 720 and wireless communication manager 720 may pass information 775 to receiver 710. Similarly, wireless communication manager 720 may pass information 780 to transmitter 730 and transmitter 730 may pass information 780 to wireless communication manager 720.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one radio frequency (RF) receiver, such as at least one RF receiver operable to receive transmissions over at least one radio frequency spectrum band. In some examples, one or more of the at least one radio frequency spectrum band may be used for narrow-band communications (e.g., NB-LTE communications), as described, for example, with reference to FIGS. 1-6. The receiver 710 may be used to receive various data or control signals (i.e., transmissions) over one or more communication links of a wireless communication system, such as one or more communication links of the wireless communication system 100 or 200 described with reference to FIG. 1 or 2.

In some examples, the transmitter 730 may include at least one RF transmitter, such as at least one RF transmitter operable to transmit over at least one radio frequency spectrum band. The transmitter 730 may be used to transmit various data or control signals (i.e., transmissions) over one or more communication links of a wireless communication system, such as one or more communication links of the wireless communication system 100 or 200 described with reference to FIG. 1 or 2.

In some examples, the wireless communication manager 720 may be used to manage one or more aspects of wireless communication for the device 705. In some examples, part of the wireless communication manager 720 may be incorporated into or shared with the receiver 710 or the transmitter 730. In some examples, the wireless communication manager 720 may include a CRS resource allocator 735, a NB-CRS resource allocator 745, narrow-band physical channel resource allocator 755, a narrow-band transmission manager 765, or a precoder cycler 770.

The CRS resource allocator 735 may be used to allocate, in a downlink carrier including a plurality of resource blocks over a plurality of subframes, a first set of resource elements for CRS associated with communication with one or more communication devices of a first type (e.g., LTE/LTE-A communication devices). The CRS resource allocator 735 may then pass CRS resource allocation information 740 to the narrow-band physical channel resource allocator 755.

The NB-CRS resource allocator 745 may be used to allocate, in the downlink carrier, a second set of resource elements for NB-CRS associated with communication with one or more communication devices of a second type (e.g., LTE/LTE-A communication devices). The NB-CRS resource allocator 745 may then pass NB-CRS resource allocation information 750 to the narrow-band physical channel resource allocator 755.

The narrow-band physical channel resource allocator 755 may receive CRS resource allocation information 740 from CRS resource allocator 735 and receive NB-CRS resource allocation information 750 from NB-CRS resource allocator 745. The narrow-band physical channel resource allocator 755 may then use this information to allocate resources of a resource block of the plurality of resource blocks to a narrow-band physical channel (e.g., a NB-PDCCH or NB-PDSCH) for communication with the one or more communication devices of the second type (e.g., narrow-band communication devices). The allocated resources may include a plurality of REGs, in which the plurality of REGs are rate-matched around the first set of resource elements and the second set of resource elements. The narrow-band physical channel resource allocator 755 may then pass resource allocation information 760 to the narrow-band transmission manager 765.

The narrow-band transmission manager 765 may receive the resource allocation information 760 from the narrow-band physical channel resource allocator 755. The narrow-band transmission manager 765 may then use this information to transmit information (e.g., a control channel transmission or a downlink data transmission) to the one or more communication devices of the second type mapped to a subset of the allocated resources of the narrow-band physical channel.

The precoder cycler 770 may be used to cyclically precode sequential resource elements or REGs used for mapping of the information according to a set of precoders.

Figure 8:
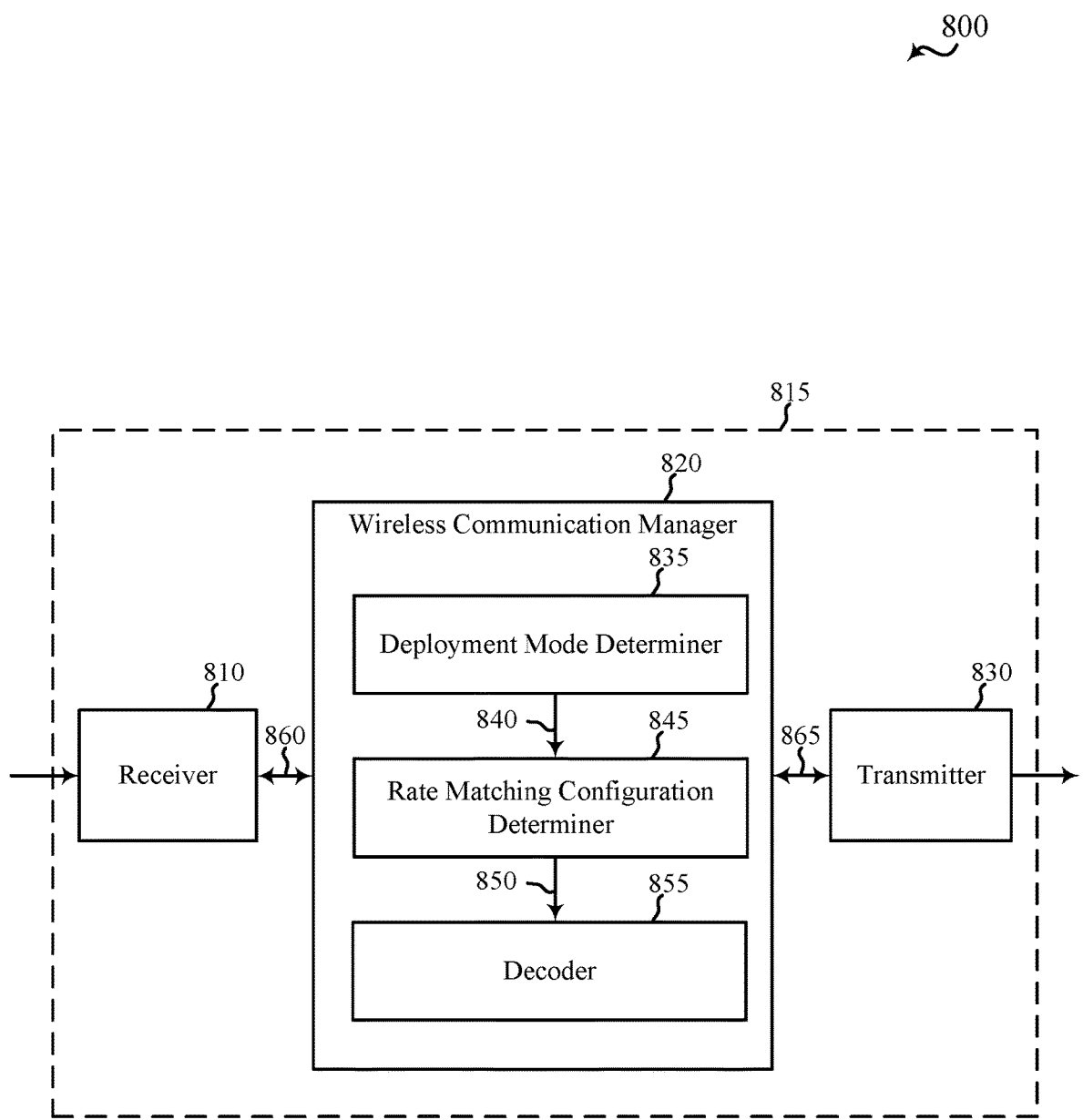
FIG. 8 shows a block diagram of a wireless device for use in wireless communication, in accordance with various aspects of the present disclosure.

FIG. 8 shows a block diagram 800 of a wireless device 815 for use in wireless communication, in accordance with various aspects of the present disclosure. The wireless device 815 may be an example of aspects of one or more of the UEs 115 described with reference to FIGS. 1 and 2. The wireless device 815 may also be or include a processor. The wireless device 815 may include a receiver 810, a wireless communication manager 820, or a transmitter 830. Each of these components may be in communication with each other. For example, receiver 810 may pass information 860 to wireless communication manager 820 and wireless communication manager 820 may pass information 860 to receiver 810. Similarly, wireless communication manager 820 may pass information 865 to transmitter 830 and transmitter 830 may pass information 865 to wireless communication manager 820.

The components of the wireless device 815 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over at least one radio frequency spectrum band. In some examples, one or more of the at least one radio frequency spectrum band may be used for narrow-band communications (e.g., NB-LTE communications), as described, for example, with reference to FIGS. 1-6. The receiver 810 may be used to receive information mapped to a subset of resources allocated to a narrow-band physical channel. The receiver 810 may also be used to receive various data or control signals (i.e., transmissions) over one or more communication links of a wireless communication system, such as one or more communication links of the wireless communication system 100 or 200 described with reference to FIG. 1 or 2.

In some examples, the transmitter 830 may include at least one RF transmitter, such as at least one RF transmitter operable to transmit over at least one radio frequency spectrum band. The transmitter 830 may be used to transmit various data or control signals (i.e., transmissions) over one or more communication links of a wireless communication system, such as one or more communication links of the wireless communication system 100 or 200 described with reference to FIG. 1 or 2.

In some examples, the wireless communication manager 820 may be used to manage one or more aspects of wireless communication for the wireless device 815. In some examples, part of the wireless communication manager 820 may be incorporated into or shared with the receiver 810 or the transmitter 830. In some examples, the wireless communication manager 820 may include a deployment mode determiner 835, a rate matching configuration determiner 845, or a decoder 855.

The deployment mode determiner 835 may be used to determine a deployment mode of a narrow-band physical channel. The deployment mode may be an in-band deployment mode, a standalone deployment mode, or a guard band deployment mode. After determining the deployment mode, the deployment mode determiner 835 may pass deployment mode 840 to the rate matching configuration determiner 845.

The rate matching configuration determiner 845 may receive the deployment mode 840 from the deployment mode determiner 835. The rate matching configuration determiner 845 may then be used to determine a rate matching configuration associated with a subset of resources allocated to the narrow-band physical channel based on the deployment mode. In some examples, the subset of resources allocated to the narrow-band physical channel may be rate-matched around a first set of resource elements allocated to CRS and a second set of resource elements allocated to NB-CRS (e.g., for an in-band deployment mode). In other examples, the subset of resources allocated to the narrow-band physical channel may be rate matched around a set of resource elements allocated to NB-CRS (e.g., for a standalone deployment mode or a guard band deployment mode). In some cases, the allocated resources may include a plurality of REGs, and the plurality of REGs may be rate matched around a set of resource elements allocated to NB-CRS.

In some cases, the decoder 855 may receive information 860 from receiver 810, and the decoder 855 may receive rate matching configuration 850 from the rate matching configuration determiner 845. The decoder 855 may then decode the received information 860 based on the rate matching configuration 850.

Figure 9:
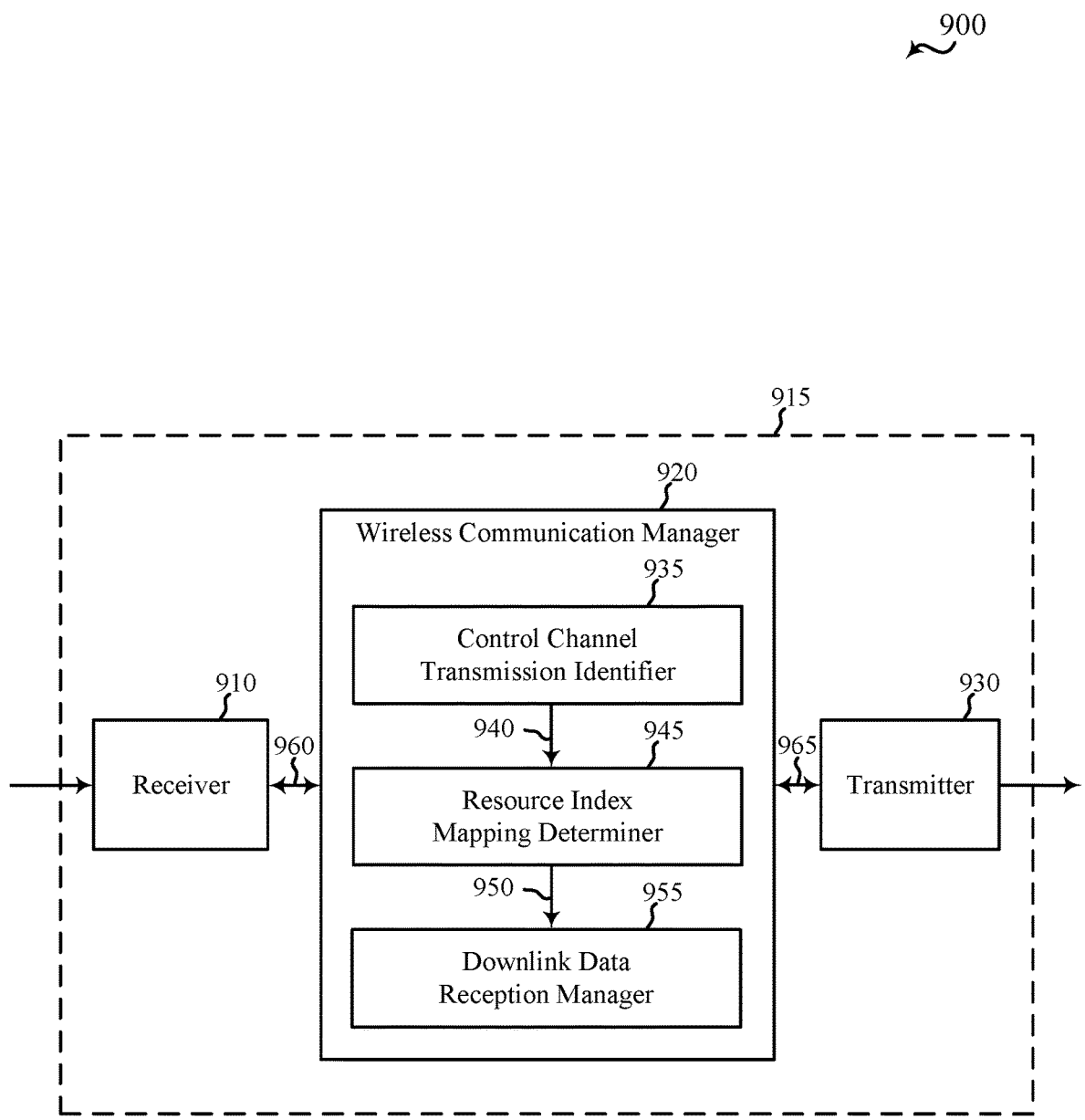
FIG. 9 shows a block diagram of a wireless device for use in wireless communication, in accordance with various aspects of the present disclosure.

FIG. 9 shows a block diagram 900 of a wireless device 915 for use in wireless communication, in accordance with various aspects of the present disclosure. The wireless device 915 may be an example of aspects of one or more of the UEs 115 described with reference to FIGS. 1 and 2. The wireless device 915 may also be or include a processor. The wireless device 915 may include a receiver 910, a wireless communication manager 920, or a transmitter 930. Each of these components may be in communication with each other. For example, receiver 910 may pass information 960 to wireless communication manager 920 and wireless communication manager 920 may pass information 960 to receiver 910. Similarly, wireless communication manager 920 may pass information 965 to transmitter 930 and transmitter 930 may pass information 965 to wireless communication manager 920.

The components of the wireless device 915 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over at least one radio frequency spectrum band. In some examples, one or more of the at least one radio frequency spectrum band may be used for narrow-band communications (e.g., NB-LTE communications), as described, for example, with reference to FIGS. 1-6. The receiver 910 may be used to receive various data or control signals (i.e., transmissions) over one or more communication links of a wireless communication system, such as one or more communication links of the wireless communication system 100 or 200 described with reference to FIG. 1 or 2.

In some examples, the transmitter 930 may include at least one RF transmitter, such as at least one RF transmitter operable to transmit over at least one radio frequency spectrum band. The transmitter 930 may be used to transmit various data or control signals (i.e., transmissions) over one or more communication links of a wireless communication system, such as one or more communication links of the wireless communication system 100 or 200 described with reference to FIG. 1 or 2.

In some examples, the wireless communication manager 920 may be used to manage one or more aspects of wireless communication for the wireless device 915. In some examples, part of the wireless communication manager 920 may be incorporated into or shared with the receiver 910 or the transmitter 930. In some examples, the wireless communication manager 920 may include a control channel transmission identifier 935, a resource index mapping determiner 945, or a downlink data reception manager 955.

The control channel transmission identifier 935 may be used to identify, in a first transmission interval (e.g., a first subframe), a control channel transmission in a search space of a narrow-band physical control channel (e.g., a NB-PDCCH). The control channel transmission may include an indicator of a resource grant for a downlink data transmission to the wireless device in a narrow-band downlink data channel (e.g., an NB-PDSCH). The narrow-band physical control channel and narrow-band downlink data channel may be variously deployed as standalone, guard band, or in-band channels, as described with reference to FIG. 3. In some examples, the search space may span all of a plurality of symbol periods within the first transmission interval, and in other examples, the search space may span a subset of the plurality of symbol periods, as described, for example, with reference to FIGS. 4 and 5.

In some examples, the downlink data transmission and/or narrow-band downlink data channel may be received in a set of one or more subframes other than the subframe in which the control channel transmission and/or narrow-band physical control channel is received. The indicator of the resource grant may include, for example, an identifier of the wireless device, a TB size of the downlink data transmission, a number of subframes of the downlink data transmission, an MCS for the downlink data transmission, or a combination thereof, with the resource grant being inferred from (or implicit in) the existence of the preceding information. The transmission parameters of the downlink data transmission (e.g., a TB size of the downlink data transmission, a number of subframes of the downlink data transmission, or an MCS for the downlink data transmission) may be the same as, or different from, corresponding transmission parameters of the control channel transmission. In some examples, the control channel transmission may be identified based on a blind decoding of the narrow-band physical control channel. Control channel transmission identifier 935 may then pass the control channel transmission information 940 to the resource index mapping determiner 945.

The resource index mapping determiner 945 may receive the control channel transmission information 940 from the control channel transmission identifier 935. The resource index mapping determiner 945 may then use this information to determine a resource mapping between a first resource index of the control channel transmission in the narrow-band physical control channel and a second resource index of the downlink data transmission in the narrow-band downlink data channel, as described with reference to FIG. 6. In some examples, the first resource index may be determined based on a deployment mode of the narrow-band physical control channel (e.g., based on one of the deployment modes described with reference to FIG. 3). In some examples, the first resource index may include a first number of REGs that the control channel transmission is offset in the narrow-band physical control channel, and the second resource index may include a second number of REGs that the downlink data transmission is offset in the narrow-band downlink data channel. The second number may be the same as, or different from, the first number. In other examples, the offsets may be expressed in terms other than numbers of REGs (e.g., numbers of REs or numbers of CCEs). The resource index mapping determiner 945 may then pass resource index information 950 to the downlink data reception manager 955.

The downlink data reception manager 955 may receive the resource index information 950 and use this information to receive the downlink data transmission based on the second resource index.

Figure 10:
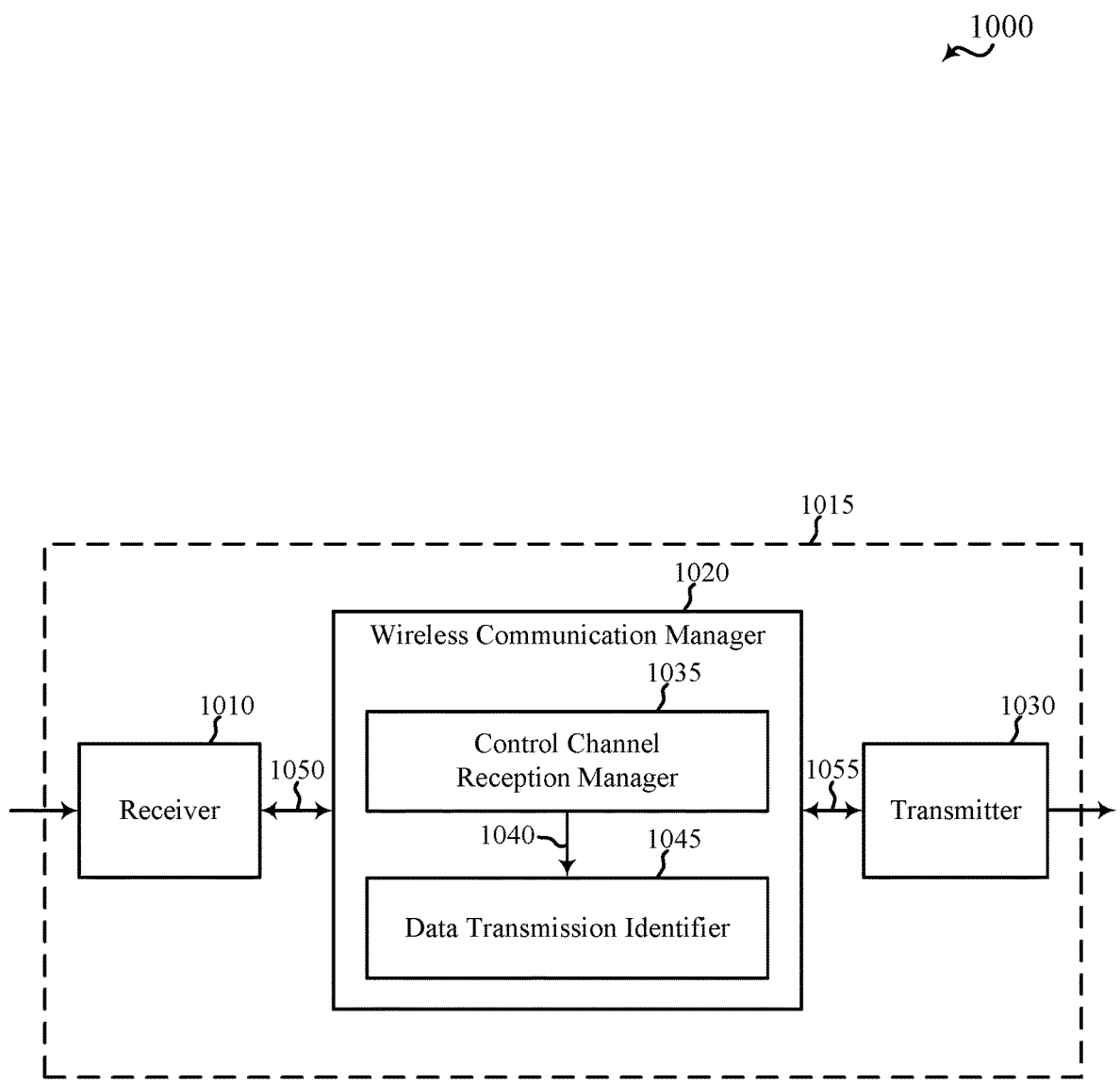
FIG. 10 shows a block diagram of a wireless device for use in wireless communication, in accordance with various aspects of the present disclosure.

FIG. 10 shows a block diagram 1000 of a wireless device 1015 for use in wireless communication, in accordance with various aspects of the present disclosure. The wireless device 1015 may be an example of aspects of one or more of the UEs 115 described with reference to FIGS. 1 and 2. The wireless device 1015 may also be or include a processor. The wireless device 1015 may include a receiver 1010, a wireless communication manager 1020, or a transmitter 1030. Each of these components may be in communication with each other. For example, receiver 1010 may pass information 1050 to wireless communication manager 1020 and wireless communication manager 1020 may pass information 1050 to receiver 1010. Similarly, wireless communication manager 1020 may pass information 1055 to transmitter 1030 and transmitter 1030 may pass information 1055 to wireless communication manager 1020.

The components of the wireless device 1015 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs), a SoC, and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one RF receiver, such as at least one RF receiver operable to receive transmissions over at least one radio frequency spectrum band. In some examples, one or more of the at least one radio frequency spectrum band may be used for narrow-band communications (e.g., NB-LTE communications), as described, for example, with reference to FIGS. 1-6. The receiver 1010 may be used to receive various data or control signals (i.e., transmissions) over one or more communication links of a wireless communication system, such as one or more communication links of the wireless communication system 100 or 200 described with reference to FIG. 1 or 2.

In some examples, the transmitter 1030 may include at least one RF transmitter, such as at least one RF transmitter operable to transmit over at least one radio frequency spectrum band. The transmitter 1030 may be used to transmit various data or control signals (i.e., transmissions) over one or more communication links of a wireless communication system, such as one or more communication links of the wireless communication system 100 or 200 described with reference to FIG. 1 or 2.

In some examples, the wireless communication manager 1020 may be used to manage one or more aspects of wireless communication for the wireless device 1015. In some examples, part of the wireless communication manager 1020 may be incorporated into or shared with the receiver 1010 or the transmitter 1030. In some examples, the wireless communication manager 1020 may include a control channel reception manager 1035 or a data transmission identifier 1045.

The control channel reception manager 1035 may be used to receive a narrow-band physical control channel (e.g., a NB-PDCCH) including a plurality of REGs. The narrow-band physical control channel may be variously deployed as a standalone, guard band, or in-band channel, as described with reference to FIG. 3. The control channel reception manager 1035 may then pass narrow-band physical control channel information 1040 to the data transmission identifier 1045.

The data transmission identifier 1045 may receive the narrow-band physical control channel information 1040 from the control channel reception manager 1035. The data transmission identifier 1045 may then use this information to identify, in the narrow-band physical control channel, a data transmission including a first data header (e.g., a MAC header) and a data payload mapped to a set of the plurality of REGs having a same size as at least one format for control channel transmissions over the narrow-band physical control channel. In some examples, the data transmission may be identified by descrambling a CRC value of a decoded control transmission candidate with a data identifier (e.g., a data-RNTI). In some examples, the data transmission may be identified by performing a cyclic redundancy check for a decoded control transmission candidate with a CRC value having a different length than for identifying the at least one format for control channel transmissions.

In some examples, the first data header may have a different size than a second data header for transmissions of data via a narrow-band data channel (e.g., an NB-PDSCH) allocated by control transmissions in the narrow-band physical control channel. For example, the first data header may be smaller than the second data header. In comparison to the second data header, and in some examples, the first data header may have a reduced payload field (indicating a fixed payload size or a small number of hypothesis), a reduced LCID field (indicating a fixed LCID or small number of LCIDs), no F field (e.g., because the payload field may be constant or semi-static), and/or no reserved bits or extension bits.

Figure 11:
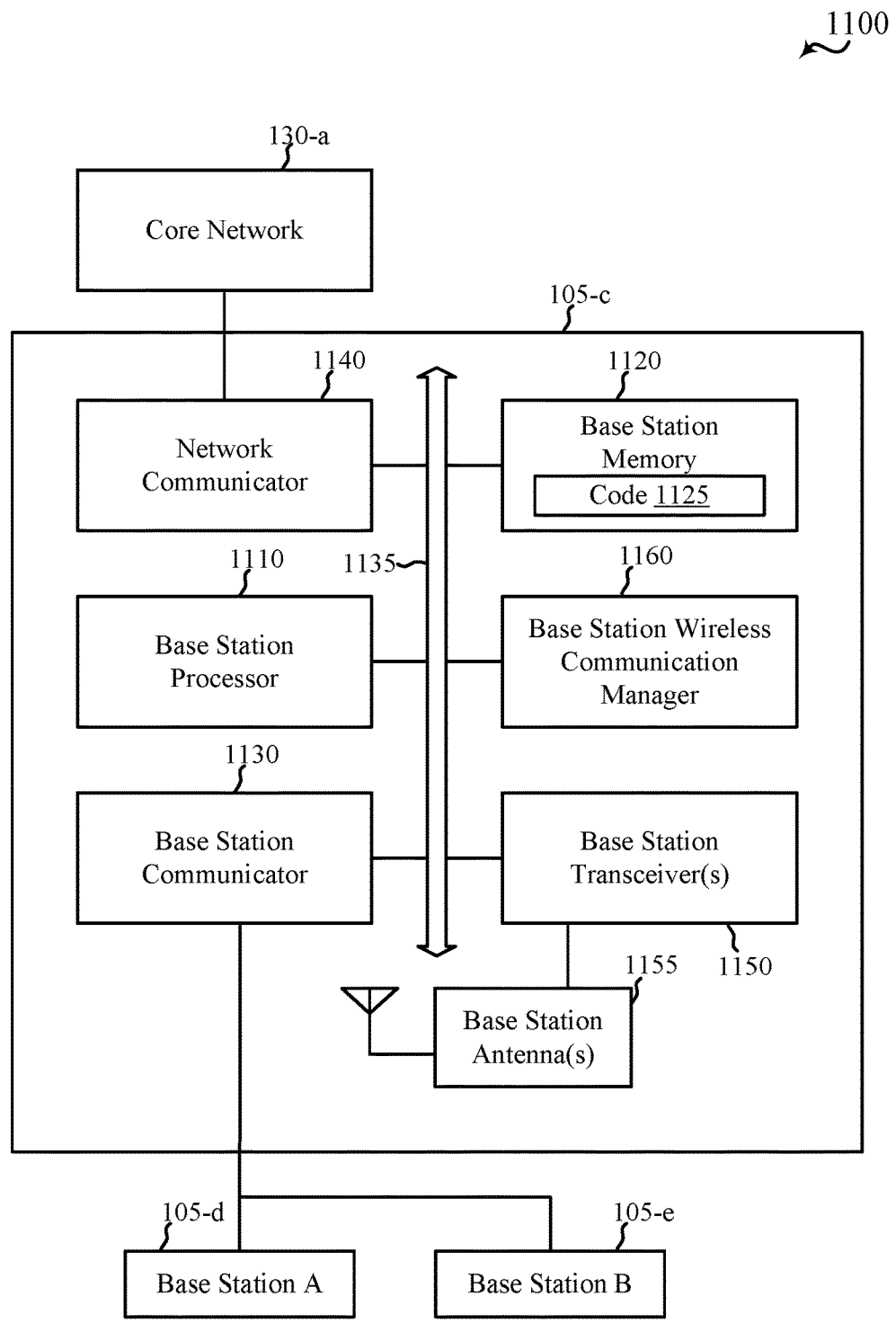
FIG. 11 shows a block diagram of a base station (e.g., a base station forming part or all of an eNB) for use in wireless communication, in accordance with various aspects of the present disclosure.

FIG. 11 shows a block diagram 1100 of a base station 105-c (e.g., a base station forming part or all of an eNB) for use in wireless communication, in accordance with various aspects of the present disclosure. In some examples, the base station 105-c may be an example of aspects of one or more of the base stations 105 or the device 705 described with reference to FIGS. 1, 2, and 7. The base station 105-c may be configured to implement or facilitate at least some of the base station features and functions described with reference to FIGS. 1-7.

The base station 105-c may include a base station processor 1110, a base station memory 1120, at least one base station transceiver (represented by base station transceiver(s) 1150), at least one base station antenna (represented by base station antenna(s) 1155), or a base station wireless communication manager 1160. The base station 105-c may also include one or more of a base station communicator 1130 or a network communicator 1140. Each of these components may be in communication with each other, directly or indirectly, over one or more buses 1135.

The base station memory 1120 may include random access memory (RAM) or read-only memory (ROM). The base station memory 1120 may store computer-readable, computer-executable code 1125 containing instructions that are configured to, when executed, cause the base station processor 1110 to perform various functions described herein related to wireless communication, including, for example, transmitting narrow-band communications in a narrow-band physical control channel or a narrow-band downlink data channel. Alternatively, the code 1125 may not be directly executable by the base station processor 1110 but be configured to cause the base station 105-c (e.g., when compiled and executed) to perform various of the functions described herein.

The base station processor 1110 may include an intelligent hardware device, e.g., a central processing unit (CPU), a microcontroller, an ASIC, etc. The base station processor 1110 may process information received through the base station transceiver(s) 1150, the base station communicator 1130, or the network communicator 1140. The base station processor 1110 may also process information to be sent to the transceiver(s) 1150 for transmission through the antenna(s) 1155, to the base station communicator 1130, for transmission to one or more other base stations 105-d and 105-e, or to the network communicator 1140 for transmission to a core network 130-a, which may be an example of one or more aspects of the core network 130 described with reference to FIG. 1. The base station processor 1110 may handle, alone or in connection with the base station wireless communication manager 1160, various aspects of communicating over (or managing communications over) one or more radio frequency spectrum bands.

The base station transceiver(s) 1150 may include a modem configured to modulate packets and provide the modulated packets to the base station antenna(s) 1155 for transmission, and to demodulate packets received from the base station antenna(s) 1155. The base station transceiver(s) 1150 may, in some examples, be implemented as one or more base station transmitters and one or more separate base station receivers. The base station transceiver(s) 1150 may support communication over one or more wireless communication links. The base station transceiver(s) 1150 may be configured to communicate bi-directionally, via the antenna(s) 1155, with one or more UEs or other wireless devices, such as one or more of the UEs 115 or wireless devices 815, 915, or 1015 described with reference to FIGS. 1, 8, 9, and 10. The base station 105-c may, for example, include multiple base station antennas 1155 (e.g., an antenna array). The base station 105-c may communicate with the core network 130-a through the network communicator 1140. The base station 105-c may also communicate with other base stations, such as the base stations 105-d and 105-e, using the base station communicator 1130.

The base station wireless communication manager 1160 may be configured to perform or control some or all of the features or functions described with reference to FIGS. 1-7 related to wireless communication over one or more radio frequency spectrum bands. The base station wireless communication manager 1160, or portions of it, may include a processor, or some or all of the functions of the base station wireless communication manager 1160 may be performed by the base station processor 1110 or in connection with the base station processor 1110. In some examples, the base station wireless communication manager 1160 may be an example of the wireless communication manager 720 described with reference to FIG. 7.

Figure 12:
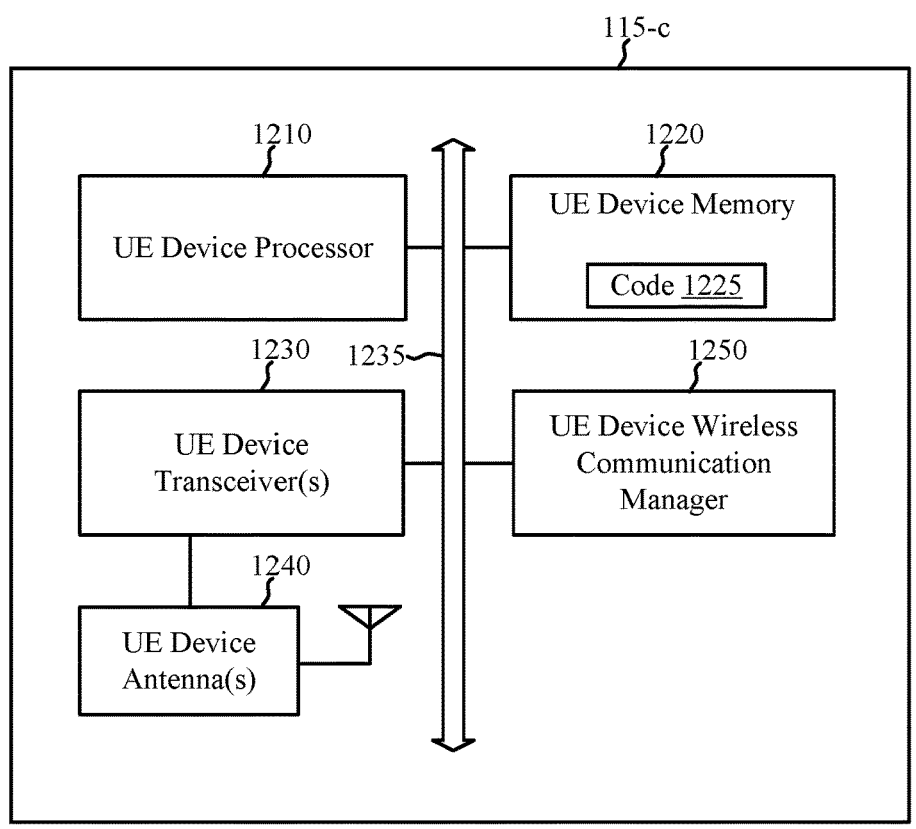
FIG. 12 shows a block diagram of a user equipment (UE) for use in wireless communication, in accordance with various aspects of the present disclosure.

FIG. 12 shows a block diagram 1200 of a UE 115-c for use in wireless communication, in accordance with various aspects of the present disclosure. The UE 115-c may have various configurations, and in some examples may be a narrow-band and/or IoT wireless device. The UE 115-c may, in some examples, have an internal power supply (not shown), such as a small battery, to facilitate mobile or remote operation. In some examples, the UE 115-c may be an example of aspects of one or more of the UEs 115 or wireless devices 815, 915, or 1015 described with reference to FIGS. 1, 2, 8, 9, and 10. The UE 115-c may be configured to implement at least some of the UE and/or wireless device features and functions described with reference to FIGS. 1-6, 8, 9, and 10.

The UE 115-c may include a UE processor 1210, a UE memory 1220, at least one UE transceiver (represented by UE transceiver(s) 1230), at least one UE antenna (represented by UE antenna(s) 1240), or a UE wireless communication manager 1250. Each of these components may be in communication with each other, directly or indirectly, over one or more buses 1235.

The UE memory 1220 may include RAM or ROM. The UE memory 1220 may store computer-readable, computer-executable code 1225 containing instructions that are configured to, when executed, cause the UE processor 1210 to perform various functions described herein related to wireless communication, including, for example, receiving narrow-band communications in a narrow-band physical control channel or a narrow-band downlink data channel. Alternatively, the code 1225 may not be directly executable by the UE processor 1210 but be configured to cause the UE 115-c (e.g., when compiled and executed) to perform various of the functions described herein.

The UE processor 1210 may include an intelligent hardware device, e.g., a central processing unit (CPU), a microcontroller, an ASIC, etc. The UE processor 1210 may process information received through the UE transceiver(s) 1230 or information to be sent to the UE transceiver(s) 1230 for transmission through the UE antenna(s) 1240. The UE processor 1210 may handle, alone or in connection with the UE wireless communication manager 1250, various aspects of communicating over (or managing communications over) one or more radio frequency spectrum bands.

The UE transceiver(s) 1230 may include a modem configured to modulate packets and provide the modulated packets to the UE antenna(s) 1240 for transmission, and to demodulate packets received from the UE antenna(s) 1240. The UE transceiver(s) 1230 may, in some examples, be implemented as one or more UE transmitters and one or more separate UE receivers. The UE transceiver(s) 1230 may support communications over one or more wireless communication links. The UE transceiver(s) 1230 may be configured to communicate bi-directionally, via the UE antenna(s) 1240, with one or more base stations or other devices, such as one or more of the base stations 105 or devices 705 described with reference to FIGS. 1, 2, and 7. While the UE 115-c may include a single UE antenna, there may be examples in which the UE 115-c may include multiple UE antennas 1240.

The UE wireless communication manager 1250 may be configured to perform or control some or all of the UE or wireless device features or functions described with reference to FIGS. 1-6, 8, 9, and 10 related to wireless communication over one or more radio frequency spectrum bands. The UE wireless communication manager 1250, or portions of it, may include a processor, or some or all of the functions of the UE wireless communication manager 1250 may be performed by the UE processor 1210 or in connection with the UE processor 1210. In some examples, the UE wireless communication manager 1250 may be an example of the wireless communication managers 820, 920, or 1020 described with reference to FIGS. 8, 9, and 10.

Figure 13:
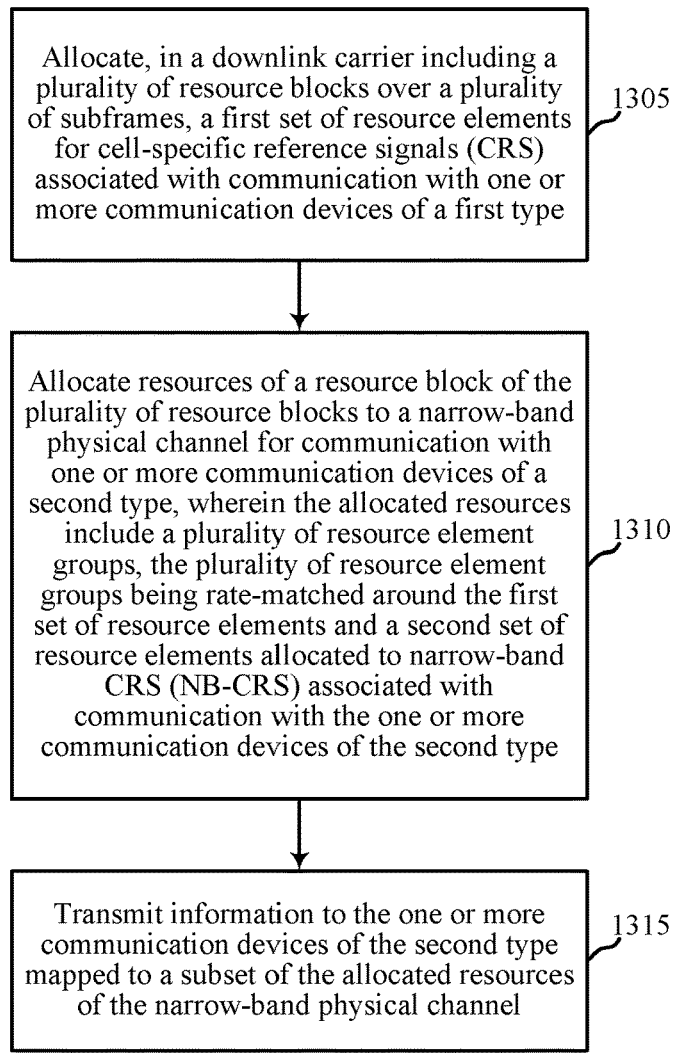
FIG. 13 is a flow chart illustrating an example of a method for communication at a base station, in accordance with various aspects of the present disclosure.

FIG. 13 is a flow chart illustrating an example of a method 1300 for communication at a base station, in accordance with various aspects of the present disclosure. For clarity, the method 1300 is described below with reference to aspects of one or more of the base stations 105 described with reference to FIGS. 1, 2, and 11, aspects of the device 705 described with reference to FIG. 7, or aspects of one or more of the wireless communication managers 720 or 1160 described with reference to FIGS. 7 and 11. In some examples, a base station may execute one or more sets of codes to control the functional elements of the base station to perform the functions described below. Additionally or alternatively, the base station may perform one or more of the functions described below using special-purpose hardware.

At block 1305, the method 1300 may include allocating, in a downlink carrier including a plurality of resource blocks over a plurality of subframes, a first set of resource elements for CRS associated with communication with one or more communication devices of a first type (e.g., LTE/LTE-A communication devices). The operation(s) at block 1305 may be performed using the wireless communication manager 720 or 1160 described with reference to FIGS. 7 and 11, or the CRS resource allocator 735 described with reference to FIG. 7.

At block 1310, the method 1300 may include allocating resources of a resource block of the plurality of resource blocks to a narrow-band physical channel (e.g., a NB-PDCCH or NB-PDSCH) for communication with one or more communication devices of a second type (e.g., narrow-band communication devices). The allocated resources may include a plurality of REGs, in which the plurality of REGs are rate-matched around the first set of resource elements and a second set of resource elements. The second set of resource elements may be allocated to NB-CRS associated with communication with the one or more communication devices of the second type. The operation(s) at block 1310 may be performed using the wireless communication manager 720 or 1160 described with reference to FIGS. 7 and 11, or the NB-CRS resource allocator 745 or narrow-band physical channel resource allocator 755 described with reference to FIG. 7.

At block 1315, the method 1300 may include transmitting information (e.g., a control channel transmission or a downlink data transmission) to the one or more communication devices of the second type mapped to a subset of the allocated resources of the narrow-band physical channel. The operation(s) at block 1315 may be performed using the wireless communication manager 720 or 1160 described with reference to FIGS. 7 and 11, or the narrow-band transmission manager 765 described with reference to FIG. 7.

In some examples, the method 1300 may include cyclically precoding sequential resource elements or REGs used for mapping of the information according to a set of precoders.

Thus, the method 1300 may provide for wireless communication. It should be noted that the method 1300 is just one implementation and that the operations of the method 1300 may be rearranged or otherwise modified such that other implementations are possible.

Figure 14:
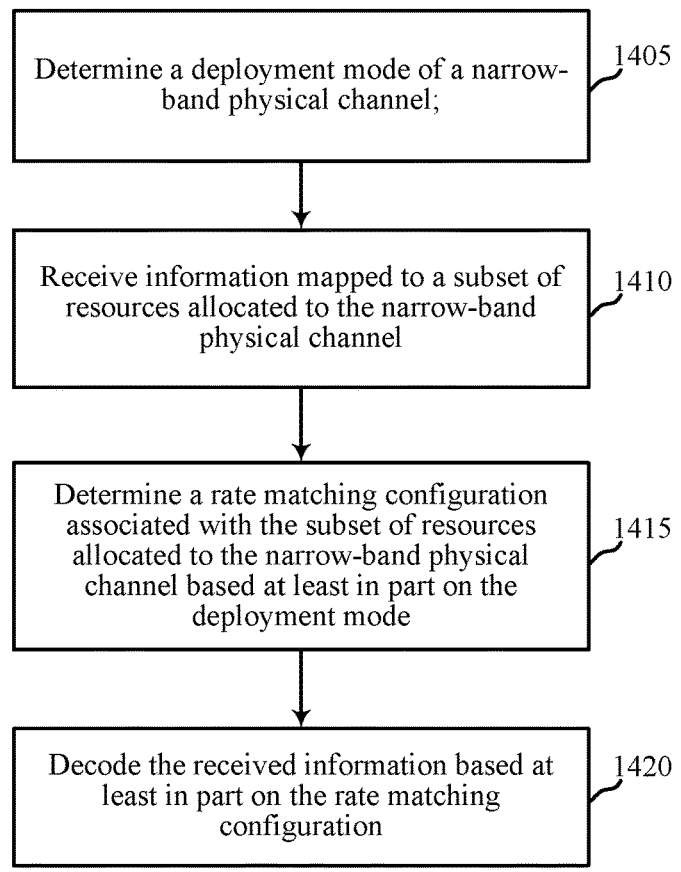
FIG. 14 is a flow chart illustrating an example of a method for communication at a wireless device, in accordance with various aspects of the present disclosure.

FIG. 14 is a flow chart illustrating an example of a method 1400 for communication at a wireless device, in accordance with various aspects of the present disclosure. For clarity, the method 1400 is described below with reference to aspects of one or more of the UEs 115 described with reference to FIGS. 1, 2, and 12, aspects of the wireless device 815 described with reference to FIG. 8, or aspects of one or more of the wireless communication managers 820 or 1250 described with reference to FIGS. 8 and 12. In some examples, a wireless device may execute one or more sets of codes to control the functional elements of the wireless device to perform the functions described below. Additionally or alternatively, the wireless device may perform one or more of the functions described below using special-purpose hardware.

At block 1405, the method 1400 may include determining a deployment mode of a narrow-band physical channel. The narrow-band physical control channel may be variously deployed as a standalone, guard band, or in-band channel, as described with reference to FIG. 3. The operation(s) at block 1605 may be performed using the wireless communication manager 820 or 1250 described with reference to FIGS. 8 and 12, or the deployment mode determiner 835 described with reference to FIG. 8.

At block 1410, the method 1400 may include receiving information mapped to a subset of resources allocated to the narrow-band physical channel. The operation(s) at block 1410 may be performed using the wireless communication manager 820 or 1250 described with reference to FIGS. 8 and 12, or the receiver 810 described with reference to FIG. 8.

At block 1415, the method 1400 may include determining a rate matching configuration associated with the subset of resources allocated to the narrow-band physical channel based at least in part on the deployment mode. In some examples, the subset of resources allocated to the narrow-band physical channel may be rate-matched around a first set of resource elements allocated to CRS and a second set of resource elements allocated to NB-CRS (e.g., for an in-band deployment mode). In other examples, the subset of resources allocated to the narrow-band physical channel may be rate matched around a set of resource elements allocated to NB-CRS (e.g., for a standalone deployment mode or a guard band deployment mode). In some cases, the allocated resources may include a plurality of REGs, and the plurality of REGs may be rate matched around a set of resource elements allocated to NB-CRS. The operation(s) at block 1415 may be performed using the wireless communication manager 820 or 1250 described with reference to FIGS. 8 and 12, or the rate matching configuration determiner 845 described with reference to FIG. 8.

At block 1420, the method 1400 may include decoding the received information based at least in part on the rate matching configuration. The operation(s) at block 1420 may be performed using the wireless communication manager 820 or 1250 described with reference to FIGS. 8 and 12, or the decoder 855 described with reference to FIG. 8.

Thus, the method 1400 may provide for wireless communication. It should be noted that the method 1400 is just one implementation and that the operations of the method 1400 may be rearranged or otherwise modified such that other implementations are possible.

Figure 15:
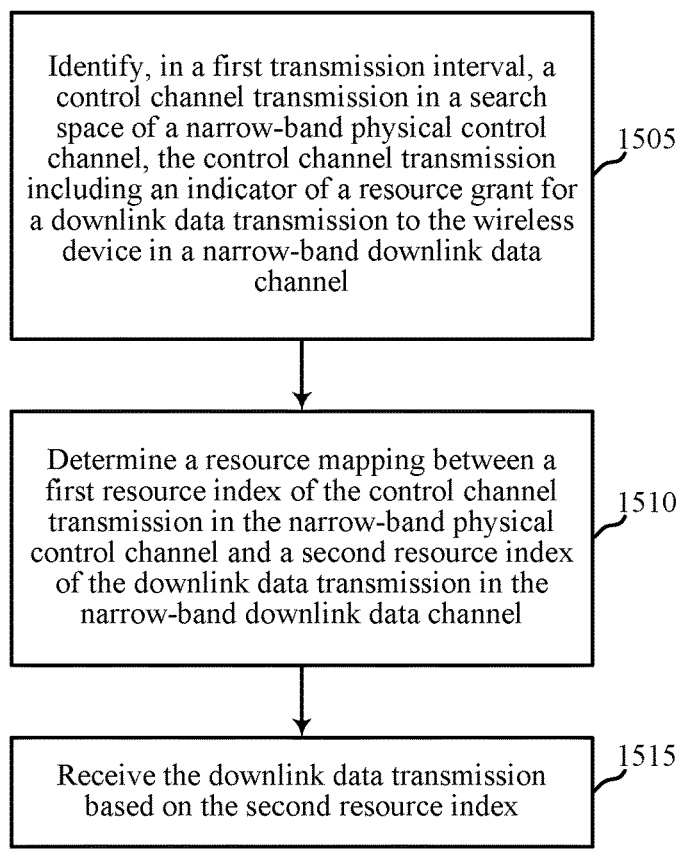
FIG. 15 is a flow chart illustrating an example of a method for communication at a wireless device, in accordance with various aspects of the present disclosure.

FIG. 15 is a flow chart illustrating an example of a method 1500 for communication at a wireless device, in accordance with various aspects of the present disclosure. For clarity, the method 1500 is described below with reference to aspects of one or more of the UEs 115 described with reference to FIGS. 1, 2, and 12, aspects of the wireless device 915 described with reference to FIG. 9, or aspects of one or more of the wireless communication managers 920 or 1250 described with reference to FIGS. 9 and 12. In some examples, a wireless device may execute one or more sets of codes to control the functional elements of the wireless device to perform the functions described below. Additionally or alternatively, the wireless device may perform one or more of the functions described below using special-purpose hardware.

At block 1505, the method 1500 may include identifying, in a first transmission interval (e.g., a first subframe), a control channel transmission in a search space of a narrow-band physical control channel (e.g., a NB-PDCCH). The control channel transmission may include an indicator of a resource grant for a downlink data transmission to the wireless device in a narrow-band downlink data channel (e.g., an NB-PDSCH). The narrow-band physical control channel and narrow-band downlink data channel may be variously deployed as standalone, guard band, or in-band channels, as described with reference to FIG. 3. In some examples, the search space may span all of a plurality of symbol periods within the first transmission interval, and in other examples, the search space may span a subset of the plurality of symbol periods, as described, for example, with reference to FIGS. 4 and 5. In some examples, the downlink data transmission and/or narrow-band downlink data channel may be received in a set of one or more subframes other than the subframe in which the control channel transmission and/or narrow-band physical control channel is received. The indicator of the resource grant may include, for example, an identifier of the wireless device, a TB size of the downlink data transmission, a number of subframes of the downlink data transmission, an MCS for the downlink data transmission, or a combination thereof, with the resource grant being inferred from (or implicit in) the existence of the preceding information. The transmission parameters of the downlink data transmission (e.g., a TB size of the downlink data transmission, a number of subframes of the downlink data transmission, or a MCS for the downlink data transmission) may be the same as, or different from, corresponding transmission parameters of the control channel transmission. In some examples, the control channel transmission may be identified based on a blind decoding of the narrow-band physical control channel. The operation(s) at block 1505 may be performed using the wireless communication manager 920 or 1250 described with reference to FIGS. 9 and 12, or the control channel transmission identifier 935 described with reference to FIG. 9.

At block 1510, the method 1500 may include determining a resource mapping between a first resource index of the control channel transmission in the narrow-band physical control channel and a second resource index of the downlink data transmission in the narrow-band downlink data channel, as described with reference to FIG. 6. In some examples, the first resource index may be determined based on a deployment mode of the narrow-band physical control channel (e.g., based on one of the deployment modes described with reference to FIG. 3). In some examples, the first resource index may include a first number of REGs that the control channel transmission is offset in the narrow-band physical control channel, and the second resource index may include a second number of REGs that the downlink data transmission is offset in the narrow-band downlink data channel. The second number may be the same as, or different from, the first number. In other examples, the offsets may be expressed in terms other than numbers of REGs (e.g., numbers of REs or numbers of CCEs). The operation(s) at block 1510 may be performed using the wireless communication manager 920 or 1250 described with reference to FIGS. 9 and 12, or the resource index mapping determiner 945 described with reference to FIG. 9.

At block 1515, the method 1500 may include receiving the downlink data transmission based on the second resource index. The operation(s) at block 1515 may be performed using the wireless communication manager 920 or 1250 described with reference to FIGS. 9 and 12, or the downlink data reception manager 955 described with reference to FIG. 9.

Thus, the method 1500 may provide for wireless communication. It should be noted that the method 1500 is just one implementation and that the operations of the method 1500 may be rearranged or otherwise modified such that other implementations are possible.

Figure 16:
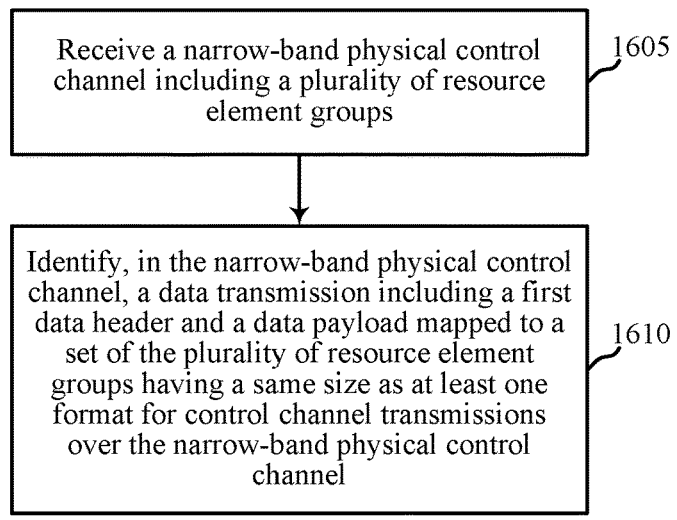
FIG. 16 is a flow chart illustrating an example of a method for communication at a wireless device, in accordance with various aspects of the present disclosure.

FIG. 16 is a flow chart illustrating an example of a method 1600 for communication at a wireless device, in accordance with various aspects of the present disclosure. For clarity, the method 1600 is described below with reference to aspects of one or more of the UEs 115 described with reference to FIGS. 1, 2, and 12, aspects of the wireless device 1015 described with reference to FIG. 10, or aspects of one or more of the wireless communication managers 1020 or 1250 described with reference to FIGS. 9 and 12. In some examples, a wireless device may execute one or more sets of codes to control the functional elements of the wireless device to perform the functions described below. Additionally or alternatively, the wireless device may perform one or more of the functions described below using special-purpose hardware.

At block 1605, the method 1600 may include receiving a narrow-band physical control channel (e.g., a NB-PDCCH) including a plurality of REGs. The narrow-band physical control channel may be variously deployed as a standalone, guard band, or in-band channel, as described with reference to FIG. 3. The operation(s) at block 1605 may be performed using the wireless communication manager 1020 or 1250 described with reference to FIGS. 10 and 12, or the control channel reception manager 1035 described with reference to FIG. 10.

At block 1610, the method 1600 may include identifying, in the narrow-band physical control channel, a data transmission including a first data header (e.g., a MAC header) and a data payload mapped to a set of the plurality of REGs having a same size as at least one format for control channel transmissions over the narrow-band physical control channel. In some examples, the data transmission may be identified by descrambling a CRC value of a decoded control transmission candidate with a data identifier (e.g., a data-RNTI). In some examples, the data transmission may be identified by performing a cyclic redundancy check for a decoded control transmission candidate with a CRC value having a different length than for identifying the at least one format for control channel transmissions. The operation(s) at block 1610 may be performed using the wireless communication manager 1020 or 1250 described with reference to FIGS. 10 and 12, or the data transmission identifier 1045 described with reference to FIG. 10.

In some examples of the method 1600, the first data header may have a different size than a second data header for transmissions of data via a narrow-band data channel (e.g., an NB-PDSCH) allocated by control transmissions in the narrow-band physical control channel. For example, the first data header may be smaller than the second data header. In comparison to the second data header, and in some examples, the first data header may have a reduced payload field (indicating a fixed payload size or a small number of hypothesis), a reduced LCID field (indicating a fixed LCID or small number of LCIDs), no F field (e.g., because the payload field may be constant or semi-static), and/or no reserved bits or extension bits.

Thus, the method 1600 may provide for wireless communication. It should be noted that the method 1600 is just one implementation and that the operations of the method 1600 may be rearranged or otherwise modified such that other implementations are possible.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of communication at a base station, comprising:
    allocating, in a downlink carrier comprising a plurality of resource blocks over a plurality of subframes, a first set of resource elements for cell-specific reference signals (CRS) associated with communication with one or more communication devices of a first type;
    allocating resources of a resource block of the plurality of resource blocks to a narrow-band physical channel for communication with one or more communication devices of a second type, the allocated resources being rate-matched around the first set of resource elements and a second set of resource elements allocated to narrow-band CRS (NB-CRS) associated with communication with the one or more communication devices of the second type; and
    transmitting information to the one or more communication devices of the second type mapped to the allocated resources of the narrow-band physical channel, wherein the transmitting is based at least in part on a transmission mode that is common to both a narrow-band physical downlink control channel (NB-PDCCH) within a first subframe and a narrow-band physical downlink shared channel (NB-PDSCH) within a second subframe, and wherein the transmitting is based at least in part on transmit diversity, and wherein the transmit diversity is based at least in part on a space frequency block coding (SFBC) scheme, and wherein the SFBC scheme is common to both the NB-PDCCH and the NB-PDSCH.

2. The method of claim 1, further comprising:
    determining to rate-match the allocated resources around the first set of resource elements and the second set of resource elements based at least in part on a deployment mode of the narrow-band physical channel.

3. The method of claim 2, wherein the deployment mode comprises an in-band deployment mode.

4. The method of claim 1, wherein the allocating the resources of the resource block comprises allocating a first set of frequency resources of the resource block for communication with a first device of the second type and allocating a second set of frequency resources of the resource block for communication with a second device of the second type.

5. The method of claim 1, wherein the allocated resources comprise a first subset of a plurality of subsets of the allocated resources associated with an aggregation level.

6. The method of claim 1, wherein the allocated resources span first and second subsets of the allocated resources that are associated with an aggregation level.

7. The method of claim 1, wherein the allocated resources comprise a plurality of resource element groups.

8. The method of claim 7, wherein the plurality of resource element groups are rate matched around the first set of resource elements and the second set of resource elements.

9. A method of communication at a user equipment (UE), comprising:
    determining a deployment mode of a narrow-band physical channel;
    receiving information mapped to resources allocated to the narrow-band physical channel, wherein the receiving is based at least in part on a transmission mode that is common to both a narrow-band physical downlink control channel (NB-PDCCH) within a first subframe and a narrow-band physical downlink shared channel (NB-PDSCH) within a second subframe, and wherein the receiving comprises demodulating based at least in part on narrow-band cell-specific reference signals (NB-CRS), and wherein the receiving is based at least in part on transmit diversity, and wherein the transmit diversity is based at least in part on a space frequency block coding (SFBC) scheme, and wherein the SFBC scheme is common to both the NB-PDCCH and the NB-PDSCH;
  determining a rate matching configuration associated with the resources allocated to the narrow-band physical channel based at least in part on the deployment mode; and
  decoding the received information based at least in part on the rate matching configuration.

10. The method of claim 9, wherein the deployment mode comprises an in-band deployment mode.

11. The method of claim 10, wherein the resources allocated to the narrow-band physical channel are rate-matched around a first set of resource elements allocated to cell-specific reference signals (CRS) and a second set of resource elements allocated to NB-CRS.

12. The method of claim 9, wherein the deployment mode comprises a standalone deployment mode or a guard band deployment mode.

13. The method of claim 12, wherein the resources allocated to the narrow-band physical channel are rate-matched around a set of resource elements allocated to NB-CRS.

14. The method of claim 9, wherein the resources allocated to the narrow-band physical channel comprise a first subset of a plurality of subsets of the resources allocated to the narrow-band physical channel associated with an aggregation level.

15. The method of claim 9, wherein the resources allocated to the narrow-band physical channel span first and second subsets of the resources allocated to the narrow-band physical channel that are associated with an aggregation level.

16. The method of claim 9, wherein the resources allocated to the narrow-band physical channel comprise a plurality of resource element groups.

17. The method of claim 16, wherein the plurality of resource element groups are rate-matched around a set of resource elements allocated to NB-CRS.

18. A method of communication at a wireless device, comprising:
  receiving a narrow-band physical control channel;
  identifying, in the narrow-band physical control channel, a data transmission comprising a first data header and a data payload received via a set of resources of the narrow-band physical control channel, wherein the set of resources has a same size as at least one downlink control information (DCI) format supported by the narrow-band physical control channel, and wherein the at least one DCI format is associated with a first cyclic redundancy check value of a first length and a first radio network temporary identifier associated with a control transmission, and wherein the identifying is based at least in part on the data transmission having a second cyclic redundancy check value of a second length that is different than the first length and a second radio network temporary identifier associated with the data transmission that is different than the first radio network temporary identifier associated with the control transmission; and
  communicating with a base station based at least in part on the identified data transmission.

19. The method of claim 18, further comprising:
  decoding a control transmission candidate to obtain the data transmission, wherein the identifying is based at least in part on descrambling the second cyclic redundancy check value of the decoded control transmission candidate with the second radio network temporary identifier associated with the data transmission.

20. The method of claim 18, wherein the set of resources comprises a plurality of resource element groups.

21. The method of claim 18, wherein the first data header within the data transmission has a first size that is different than a second size for data headers within data transmissions via a narrow-band physical data channel allocated by control transmissions in the narrow-band physical control channel.

22. An apparatus for wireless communication, comprising:
  means for allocating, in a downlink carrier comprising a plurality of resource blocks over a plurality of subframes, a first set of resource elements for cell-specific reference signals (CRS) associated with communication with one or more communication devices of a first type;
  means for allocating resources of a resource block of the plurality of resource blocks to a narrow-band physical channel for communication with one or more communication devices of a second type, the allocated resources being rate-matched around the first set of resource elements and a second set of resource elements allocated to narrow-band CRS (NB-CRS) associated with communication with the one or more communication devices of the second type; and
  means for transmitting information to the one or more communication devices of the second type mapped to the allocated resources of the narrow-band physical channel, wherein the transmitting is based at least in part on a transmission mode that is common to both a narrow-band physical downlink control channel (NB-PDCCH) within a first subframe and a narrow-band physical downlink shared channel (NB-PDSCH) within a second subframe, and wherein the transmitting is based at least in part on transmit diversity, and wherein the transmit diversity is based at least in part on a space frequency block coding (SFBC) scheme, and wherein the SFBC scheme is common to both the NB-PDCCH and the NB-PDSCH.

23. The apparatus of claim 22, further comprising:
  means for determining to rate-match the allocated resources around the first set of resource elements and the second set of resource elements based at least in part on a deployment mode of the narrow-band physical channel.

24. The apparatus of claim 23, wherein the deployment mode comprises an in-band deployment mode.

25. The apparatus of claim 22, wherein the means for allocating the resources of the resource block comprises means for allocating a first set of frequency resources of the resource block for communication with a first device of the second type and means for allocating a second set of frequency resources of the resource block for communication with a second device of the second type.

26. The apparatus of claim 22, wherein the allocated resources comprise a first subset of a plurality of subsets of the allocated resources associated with an aggregation level.

27. The apparatus of claim 22, wherein the allocated resources span first and second subsets of the allocated resources that are associated with an aggregation level.

28. The apparatus of claim 22, wherein the allocated resources comprise a plurality of resource element groups.

29. An apparatus for wireless communication, comprising:
means for determining a deployment mode of a narrow-band physical channel;
means for receiving information mapped to resources allocated to the narrow-band physical channel, wherein the receiving is based at least in part on a transmission mode that is common to both a narrow-band physical downlink control channel (NB-PDCCH) within a first subframe and a narrow-band physical downlink shared channel (NB-PDSCH) within a second subframe, and wherein the receiving comprises demodulating based at least in part on narrow-band cell-specific reference signals (NB-CRS), and wherein the receiving is based at least in part on transmit diversity, and wherein the transmit diversity is based at least in part on a space frequency block coding (SFBC) scheme, and wherein the SFBC scheme is common to both the NB-PDCCH and the NB-PDSCH;
means for determining a rate matching configuration associated with the resources allocated to the narrow-band physical channel based at least in part on the deployment mode; and
means for decoding the received information based at least in part on the rate matching configuration.

30. The apparatus of claim 29, wherein the deployment mode comprises an in-band deployment mode.

31. The apparatus of claim 30, wherein the resources allocated to the narrow-band physical channel are rate-matched around a first set of resource elements allocated to cell-specific reference signals (CRS) and a second set of resource elements allocated to NB-CRS.

32. The apparatus of claim 29, wherein the deployment mode comprises a standalone deployment mode or a guard band deployment mode.

33. The apparatus of claim 32, wherein the resources allocated to the narrow-band physical channel are rate-matched around a set of resource elements allocated to NB-CRS.

34. The apparatus of claim 29, wherein the resources allocated to the narrow-band physical channel comprise a first subset of a plurality of subsets of the resources allocated to the narrow-band physical channel associated with an aggregation level.

35. The apparatus of claim 29, wherein the resources allocated to the narrow-band physical channel comprise span first and second subsets of the resources allocated to the narrow-band physical channel that are associated with an aggregation level.

36. The apparatus of claim 29, wherein the resources allocated to the narrow-band physical channel comprise a plurality of resource element groups.

37. An apparatus for wireless communication, comprising:
means for receiving a narrow-band physical control channel;
means for identifying, in the narrow-band physical control channel, a data transmission comprising a first data header and a data payload received via a set of resources of the narrow-band physical control channel, wherein the set of resources has a same size as at least one downlink control information (DCI) format supported by the narrow-band physical control channel, and wherein the at least one DCI format is associated with a first cyclic redundancy check value of a first length and a first radio network temporary identifier associated with a control transmission, and wherein the identifying is based at least in part on the data transmission having a second cyclic redundancy check value of a second length that is different than the first length and a second radio network temporary identifier associated with the data transmission that is different than the first radio network temporary identifier associated with the control transmission; and
means for communicating with a base station based at least in part on the identified data transmission.

38. The apparatus of claim 37, further comprising:
means for decoding a control transmission candidate to obtain the data transmission, wherein the identifying is based at least in part on descrambling the second cyclic redundancy check value of the decoded control transmission candidate with the second radio network temporary identifier associated with the data transmission.

39. The apparatus of claim 37, wherein the set of resources comprises a plurality of resource element groups.

40. The apparatus of claim 37, wherein the first data header within the data transmission has a first size that is different than a second size for data headers within data transmissions via a narrow-band physical data channel allocated by control transmissions in the narrow-band physical control channel.

41. An apparatus for wireless communication, in a system comprising:
a processor;
memory in electronic communication with the processor; and
instructions stored in the memory and operable, when executed by the processor, to cause the apparatus to:
allocate, in a downlink carrier comprising a plurality of resource blocks over a plurality of subframes, a first set of resource elements for cell-specific reference signals (CRS) associated with communication with one or more communication devices of a first type;
allocate resources of a resource block of the plurality of resource blocks to a narrow-band physical channel for communication with one or more communication devices of a second type, the allocated resources being rate-matched around the first set of resource elements and a second set of resource elements allocated to narrow-band CRS (NB-CRS) associated with communication with the one or more communication devices of the second type; and
transmit information to the one or more communication devices of the second type mapped to the allocated resources of the narrow-band physical channel, wherein the transmitting is based at least in part on a transmission mode that is common to both a narrow-band physical downlink control channel (NB-PDCCH) within a first subframe and a narrow-band physical downlink shared channel (NB-PDSCH) within a second subframe, and wherein the transmitting is based at least in part on transmit diversity, and wherein the transmit diversity is based at least in part on a space frequency block coding (SFBC) scheme, and wherein the SFBC scheme is common to both the NB-PDCCH and the NB-PDSCH.

42. The apparatus of claim 41, wherein the instructions are executable by the processor to cause the apparatus to:
determine to rate-match the allocated resources around the first set of resource elements and the second set of resource elements based at least in part on a deployment mode of the narrow-band physical channel.

43. The apparatus of claim 42, wherein the deployment mode comprises an in-band deployment mode.

44. The apparatus of claim 41, wherein the instructions are executable by the processor to cause the apparatus to:
allocate a first set of frequency resources of the resource block for communication with a first device of the second type and allocate a second set of frequency resources of the resource block for communication with a second device of the second type.

45. The apparatus of claim 41, wherein the allocated resources comprise a first subset of a plurality of subsets of the allocated resources associated with an aggregation level.

46. The apparatus of claim 41, wherein the allocated resources span first and second subsets of the allocated resources that are associated with an aggregation level.

47. The apparatus of claim 41, wherein the allocated resources comprise a plurality of resource element groups.

48. An apparatus for wireless communication, in a system comprising:
a processor;
memory in electronic communication with the processor; and
instructions stored in the memory and operable, when executed by the processor, to cause the apparatus to:
determine a deployment mode of a narrow-band physical channel;
receive information mapped to resources allocated to the narrow-band physical channel, wherein the receiving is based at least in part on a transmission mode that is common to both a narrow-band physical downlink control channel (NB-PDCCH) within a first subframe and a narrow-band physical downlink shared channel (NB-PDSCH) within a second subframe, and wherein the receiving comprises demodulating based at least in part on narrow-band cell-specific reference signals (NB-CRS), and wherein the receiving is based at least in part on transmit diversity, and wherein the transmit diversity is based at least in part on a space frequency block coding (SFBC) scheme, and wherein the SFBC scheme is common to both the NB-PDCCH and the NB-PDSCH;
determine a rate matching configuration associated with the resources allocated to the narrow-band physical channel based at least in part on the deployment mode; and
decode the received information based at least in part on the rate matching configuration.

49. The apparatus of claim 48, wherein the deployment mode comprises an in-band deployment mode.

50. The apparatus of claim 49, wherein the resources allocated to the narrow-band physical channel are rate-matched around a first set of resource elements allocated to cell-specific reference signals (CRS) and a second set of resource elements allocated to NB-CRS.

51. The apparatus of claim 48, wherein the deployment mode comprises a standalone deployment mode or a guard band deployment mode.

52. The apparatus of claim 51, wherein the resources allocated to the narrow-band physical channel are rate-matched around a set of resource elements allocated to NB-CRS.

53. The apparatus of claim 48, wherein the resources allocated to the narrow-band physical channel comprise a first subset of a plurality of subsets of the resources allocated to the narrow-band physical channel associated with an aggregation level.

54. The apparatus of claim 48, wherein the resources allocated to the narrow-band physical channel span first and second subsets of the resources allocated to the narrow-band physical channel that are associated with an aggregation level.

55. The apparatus of claim 48, wherein the resources allocated to the narrow-band physical channel comprise a plurality of resource element groups.

56. An apparatus for wireless communication, in a system comprising:
a processor;
memory in electronic communication with the processor; and
instructions stored in the memory and operable, when executed by the processor, to cause the apparatus to:
receive a narrow-band physical control channel;
identify, in the narrow-band physical control channel, a data transmission comprising a first data header and a data payload received via a set of resources of the narrow-band physical control channel, wherein the set of resources has a same size as at least one downlink control information (DCI) format supported by the narrow-band physical control channel, and wherein the at least one DCI format is associated with a first cyclic redundancy check value of a first length and a first radio network temporary identifier associated with a control transmission, and wherein the identifying is based at least in part on the data transmission having a second cyclic redundancy check value of a second length that is different than the first length and a second radio network temporary identifier associated with the data transmission that is different than the first radio network temporary identifier associated with the control transmission; and
communicate with a base station based at least in part on the identified data transmission.

57. The apparatus of claim 56, wherein the instructions are executable by the processor to cause the apparatus to:
decode a control transmission candidate to obtain the data transmission, wherein the identifying is based at least in part on descrambling the second cyclic redundancy check value of the decoded control transmission candidate with the second radio network temporary identifier associated with the data transmission.

58. The apparatus of claim 56, wherein the set of resources comprises a plurality of resource element groups.

59. The apparatus of claim 56, wherein the first data header within the data transmission has a first size that is different than a second size for data headers within data transmissions via a narrow-band physical data channel allocated by control transmissions in the narrow-band physical control channel.

60. A non-transitory computer readable medium storing code for wireless communication, the code comprising instructions executable by a processor to:
allocate, in a downlink carrier comprising a plurality of resource blocks over a plurality of subframes, a first set of resource elements for cell-specific reference signals (CRS) associated with communication with one or more communication devices of a first type;

allocate resources of a resource block of the plurality of resource blocks to a narrow-band physical channel for communication with one or more communication devices of a second type, the allocated resources being rate-matched around the first set of resource elements and a second set of resource elements allocated to narrow-band CRS (NB-CRS) associated with communication with the one or more communication devices of the second type; and transmit information to the one or more communication devices of the second type mapped to the allocated resources of the narrow-band physical channel, wherein the transmitting is based at least in part on a transmission mode that is common to both a narrow-band physical downlink control channel (NB-PDCCH) within a first subframe and a narrow-band physical downlink shared channel (NB-PDSCH) within a second subframe, and wherein the transmitting is based at least in part on transmit diversity, and wherein the transmit diversity is based at least in part on a space frequency block coding (SFBC) scheme, and wherein the SFBC scheme is common to both the NB-PDCCH and the NB-PDSCH.

61. A non-transitory computer readable medium storing code for wireless communication, the code comprising instructions executable by a processor to:

determine a deployment mode of a narrow-band physical channel;

receive information mapped to resources allocated to the narrow-band physical channel, wherein the receiving is based at least in part on a transmission mode that is common to both a narrow-band physical downlink control channel (NB-PDCCH) within a first subframe and a narrow-band physical downlink shared channel (NB-PDSCH) within a second subframe, and wherein the receiving comprises demodulating based at least in part on narrow-band cell-specific reference signals (NB-CRS), and wherein the receiving is based at least in part on transmit diversity, and wherein the transmit diversity is based at least in part on a space frequency block coding (SFBC) scheme, and wherein the SFBC scheme is common to both the NB-PDCCH and the NB-PDSCH;

determine a rate matching configuration associated with the resources allocated to the narrow-band physical channel based at least in part on the deployment mode; and decode the received information based at least in part on the rate matching configuration.

62. A non-transitory computer readable medium storing code for wireless communication, the code comprising instructions executable by a processor to:

receive a narrow-band physical control channel;

identify, in the narrow-band physical control channel, a data transmission comprising a first data header and a data payload received via a set of resources of the narrow-band physical control channel, wherein the set of resources has a same size as at least one downlink control information (DCI) format supported by the narrow-band physical control channel, and wherein the at least one DCI format is associated with a first cyclic redundancy check value of a first length and a first radio network temporary identifier associated with a control transmission, and wherein the identifying is based at least in part on the data transmission having a second cyclic redundancy check value of a second length that is different than the first length and a second radio network temporary identifier associated with the data transmission that is different than the first radio network temporary identifier associated with the control transmission; and communicate with a base station based at least in part on the identified data transmission.

63. The non-transitory computer readable medium of claim 62, wherein the first data header within the data transmission has a first size that is different than a second size for data headers within data transmissions via a narrow-band physical data channel allocated by control transmissions in the narrow-band physical control channel.

* * * * *